United States Patent
Pialucha

(10) Patent No.: US 11,022,436 B2
(45) Date of Patent: Jun. 1, 2021

(54) DETERMINING A THICKNESS OF A REGION OF WALL- OR PLATE-LIKE STRUCTURE

(71) Applicant: Guided Ultrasonics Ltd, London (GB)

(72) Inventor: Tomasz Pialucha, London (GB)

(73) Assignee: Guided Ultrasonics Ltd., London (GB)

( * ) Notice: Subject to any disclaimer, the term of this patent is extended or adjusted under 35 U.S.C. 154(b) by 118 days.

(21) Appl. No.: 16/323,381

(22) PCT Filed: Aug. 1, 2017

(86) PCT No.: PCT/GB2017/052242
§ 371 (c)(1),
(2) Date: Feb. 5, 2019

(87) PCT Pub. No.: WO2018/029445
PCT Pub. Date: Feb. 15, 2018

(65) Prior Publication Data
US 2020/0173773 A1 Jun. 4, 2020

(30) Foreign Application Priority Data
Aug. 11, 2016 (GB) .................................... 1613807
Feb. 9, 2017 (GB) .................................... 1702166

(51) Int. Cl.
*B06B 1/08* (2006.01)
*G01B 17/02* (2006.01)
(Continued)

(52) U.S. Cl.
CPC .............. *G01B 17/02* (2013.01); *B06B 1/085* (2013.01); *G01N 29/041* (2013.01);
(Continued)

(58) Field of Classification Search
CPC ...... G01B 17/02; B06B 1/085; G01N 29/041; G01N 29/043; G01N 29/07;
(Continued)

(56) References Cited

U.S. PATENT DOCUMENTS 4,248,092 A * 2/1981 Vasile ...................... B06B 1/04
73/643
4,305,294 A * 12/1981 Vasile ..................... G01B 17/02
73/579
(Continued)

FOREIGN PATENT DOCUMENTS

CN 103831227 A 6/2014
EP 2369334 A1 9/2011
(Continued)

OTHER PUBLICATIONS

Belanger, High order shear horizontal modes for minimum remnant thickness. Ultrasonics. Apr. 2014;54(4):1078-87.
(Continued)

*Primary Examiner* — David J Bolduc
(74) *Attorney, Agent, or Firm* — McCarter & English, LLP; David R. Burns

(57) ABSTRACT

A method of determining a thickness of a region of wall- or plate-like structure which is thinner than a thickness of a surrounding region of the structure due to a cavity in the structure is disclosed. The method comprises comparing a measured time-frequency dispersion map for at least one dispersive guided wave obtained by measuring the structure using guided waves with a reference time-frequency dispersion map obtained by modelling the structure, determining a cut-off frequency, fc, at which the measured time-frequency dispersion map and the reference time-frequency dispersion map differ and calculating the thickness of the thinner region in dependence upon the cut-off frequency.

16 Claims, 20 Drawing Sheets

(51) Int. Cl.
  *G01N 29/04* (2006.01)
  *G01N 29/07* (2006.01)
  *G01N 29/24* (2006.01)
(52) U.S. Cl.
  CPC ........... *G01N 29/043* (2013.01); *G01N 29/07* (2013.01); *G01N 29/2412* (2013.01)
(58) Field of Classification Search
  CPC .............. G01N 29/2412; G01N 29/46; G01N 29/4436; G01N 29/4472; G01N 29/343; G01N 2291/0425; G01N 2291/0258; G01N 2291/02854; G01N 2291/102; G01N 2291/2634
  See application file for complete search history.

(56) References Cited

U.S. PATENT DOCUMENTS

| | | | | |
|---|---|---|---|---|
| 4,309,905 | A * | 1/1982 | Maizenberg | G01N 27/725 324/227 |
| 4,395,913 | A * | 8/1983 | Peterson | B06B 1/04 310/313 A |
| 4,434,663 | A | 3/1984 | Peterson et al. | |
| 4,523,473 | A * | 6/1985 | Chamuel | G01N 27/725 73/583 |
| 4,669,310 | A * | 6/1987 | Lester | G01N 29/07 73/597 |
| 4,765,750 | A * | 8/1988 | Wadley | G01K 11/24 374/137 |
| 5,048,340 | A * | 9/1991 | Thompson | G01N 29/07 73/597 |
| 5,092,176 | A * | 3/1992 | Buttram | G01N 9/24 73/599 |
| 5,129,262 | A * | 7/1992 | White | G01H 13/00 310/313 R |
| 5,418,823 | A * | 5/1995 | Kervinen | G21C 17/06 376/245 |
| 5,581,037 | A * | 12/1996 | Kwun | G01N 29/14 73/623 |
| 5,811,682 | A * | 9/1998 | Ohtani | B06B 1/04 73/622 |
| 5,970,434 | A * | 10/1999 | Brophy | G01B 17/02 324/220 |
| 6,109,108 | A | 8/2000 | Ohtani et al. | |
| 6,295,677 | B1 * | 10/2001 | Kwun | G01N 29/2412 73/602 |
| 6,360,609 | B1 * | 3/2002 | Wooh | G01N 29/041 73/602 |
| 6,363,788 | B1 * | 4/2002 | Gorman | G01N 17/006 73/597 |
| 6,367,328 | B1 * | 4/2002 | Gorman | G01N 17/006 73/290 R |
| 6,373,245 | B1 * | 4/2002 | Kwun | G01N 29/11 324/240 |
| 6,561,032 | B1 * | 5/2003 | Hunaidi | G01B 17/02 702/171 |
| 6,925,881 | B1 * | 8/2005 | Kwun | G01N 29/07 73/598 |
| 8,624,589 | B2 * | 1/2014 | Puchot | G01N 29/041 324/240 |
| 2001/0019263 | A1 * | 9/2001 | Kwun | G01N 29/2412 324/217 |
| 2001/0022514 | A1 * | 9/2001 | Light | G01N 29/2412 324/240 |
| 2004/0095137 | A1 * | 5/2004 | Kwun | G01N 29/2412 324/240 |
| 2008/0178679 | A1 * | 7/2008 | Hirao | G01N 29/4427 73/643 |
| 2009/0049916 | A1 * | 2/2009 | Sargent | G01N 29/07 73/588 |
| 2010/0058869 | A1 * | 3/2010 | Cawley | G01N 29/069 73/596 |
| 2010/0263449 | A1 * | 10/2010 | Bolshakov | G01N 29/348 73/597 |
| 2010/0321009 | A1 * | 12/2010 | Lee | H01L 41/12 324/209 |
| 2012/0063631 | A1 | 3/2012 | Choi et al. | |
| 2012/0103097 | A1 | 5/2012 | Lopez Jauregui | |
| 2013/0145851 | A1 * | 6/2013 | Cho | G01N 29/2412 73/643 |
| 2013/0327148 | A1 * | 12/2013 | Yan | G01N 29/262 73/628 |
| 2015/0053009 | A1 * | 2/2015 | Yan | G01N 29/46 73/598 |
| 2016/0003779 | A1 * | 1/2016 | Seung | G01N 29/2412 73/643 |
| 2016/0109412 | A1 * | 4/2016 | Borigo | G01N 29/262 73/598 |
| 2017/0010179 | A1 * | 1/2017 | Conforti | G01N 29/24 |
| 2017/0131242 | A1 * | 5/2017 | Kannajosyula | G01N 29/262 |
| 2017/0191966 | A1 * | 7/2017 | Niri | G01N 29/041 |
| 2017/0234837 | A1 * | 8/2017 | Hall | G01N 29/2431 73/602 |
| 2017/0299554 | A1 * | 10/2017 | Bondurant | B06B 1/045 |
| 2018/0031525 | A1 * | 2/2018 | Philtron | G01N 29/069 |
| 2018/0164255 | A1 * | 6/2018 | Conforti | G01N 29/265 |

FOREIGN PATENT DOCUMENTS

| | | |
|---|---|---|
| JP | H11-125622 A | 5/1999 |
| JP | 2003-319493 A | 11/2003 |
| WO | 1999/39355 A1 | 8/1999 |
| WO | 2001/63276 A1 | 8/2001 |
| WO | 2018/029445 A1 | 2/2018 |

OTHER PUBLICATIONS

Nurmalia et al., Detection of Shear Horizontal Guided Waves Propagating in Aluminum Plate with Thinning Region. Japanese Journal of Applied Physics. 2011;50:07HC17, 5 pages.
Nurmalia et al., Mode conversion behavior of SH guided wave in a tapered plate. NDT&E International. 2012;45:156-161.
Rose et al., Using Ultrasonic Guided Wave Mode Cutoff for Corrosion Detection and Classification. IEEE Ultrasonics Symposiu, pp. 851-854, (1998).
Silva et al., Hidden corrosion detection in aircraft aluminum structures using laser ultrasonics and wavelet transform signal analysis. Ultrasonics. Jun. 2003;41(4):301-5.
Tuzzeo et al., Noncontact Air-Coupled Guided Wave Ultrasonics for Detection of Thinning Defects in Aluminum Plates. Res Nondestr Eval. 2001:61-77.
Zhu et al., Ultrasonic Guided Wave NDT for Hidden Corrosion Detection. Res Nondestr Eval. 1998;10:205-225.
Great Britain Office Action for Application No. GB1613807.5, dated Jan. 30, 2017, 8 pages.
Great Britain Office Action for Application No. GB1702166.8, dated Mar. 1, 2017, 7 pages.
International Search Report and Written Opinion for Application No. PCT/GB2017/052242, dated Jan. 3, 2018, 19 pages.
UK Examination Report, dated Oct. 12, 2020.

* cited by examiner

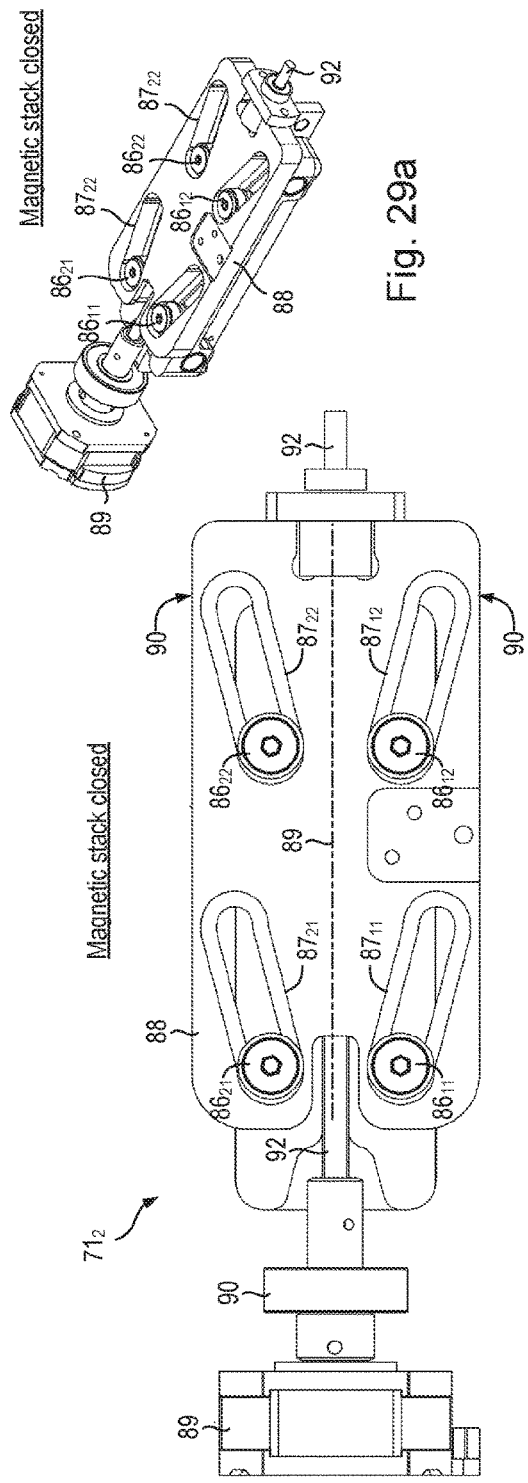
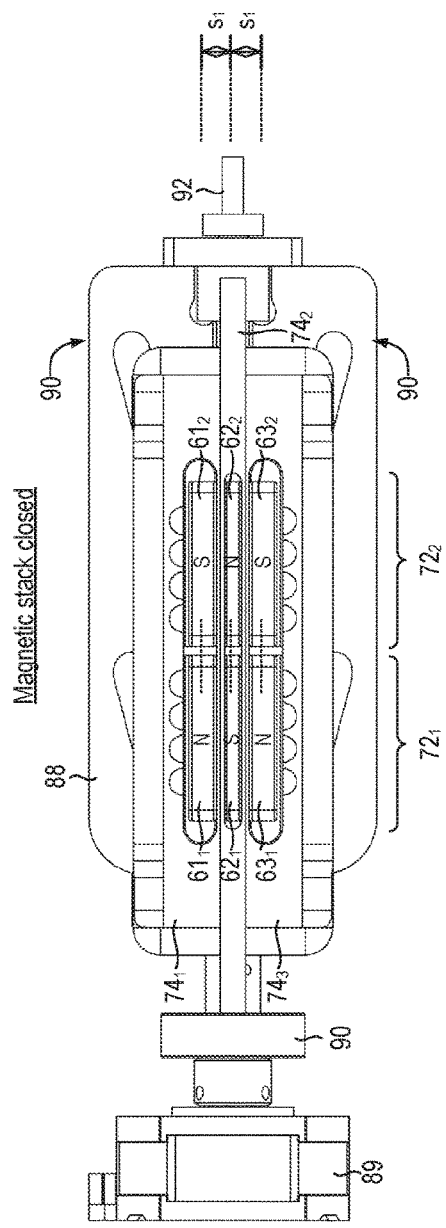
Fig. 27a
Fig. 28a
Fig. 29a

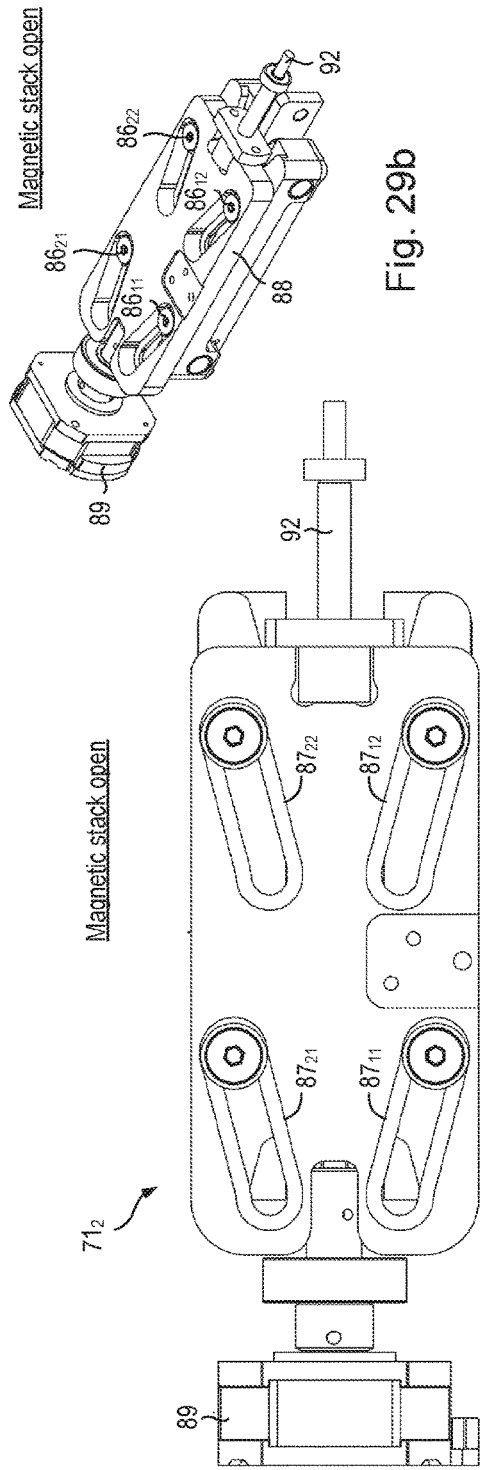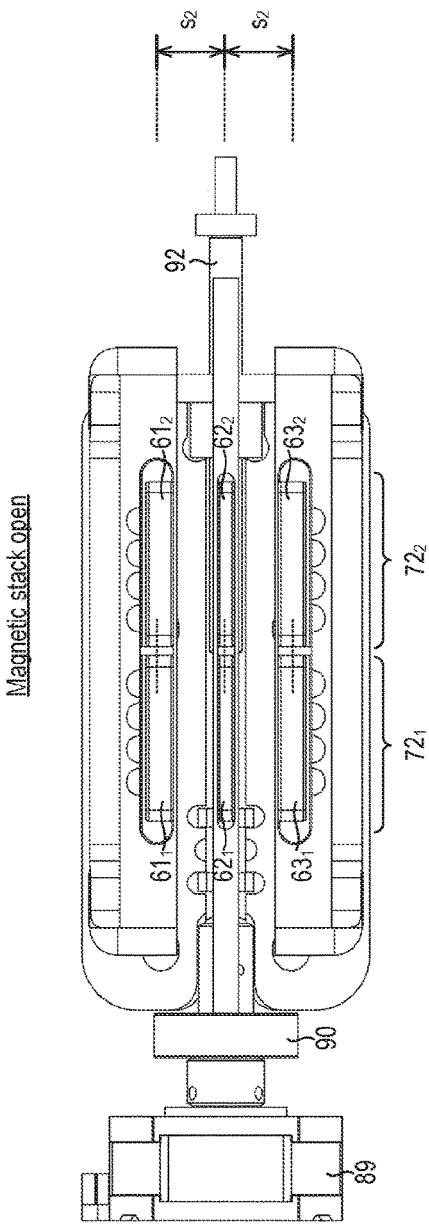

DETERMINING A THICKNESS OF A REGION OF WALL- OR PLATE-LIKE STRUCTURE

CROSS-REFERENCE TO RELATED PATENT APPLICATIONS

This application is a 35 U.S.C. § 371 National Stage filing of International Application No. PCT/GB2017/052242, filed on Aug. 1, 2017 which claims priority to UK Patent Application No. 1702166.8, filed on Feb. 9, 2017 and UK Patent Application No. 1613807.5, filed on Aug. 11, 2016. The content of each application is hereby incorporated by reference in its entirety.

FIELD OF THE INVENTION

The present invention relates to determining a thickness of a region of a wall- or plate-like structure, such as a wall, plate, pipe or a hollow bar.

The present invention also relates to a transducer for guided wave inspection.

BACKGROUND

Ultrasonic guided waves can be used to inspect pipes, rails, rods, plates and other types of structures for corrosion-type defects, cracks and other types of flaws.

Guided waves can be used to screen structures over long ranges extending, for example, over tens or hundreds of metres. Moreover, guided waves can be used to inspect structures that are coated with insulation, which are difficult to access (for example, due to being buried or being underwater) and/or while they are in use.

An introduction to and an overview of the capabilities of long range ultrasonic guided wave testing systems can be found in M. Lowe and P. Cawley: "Long Range Guided Wave Inspection Usage—Current Commercial Capabilities and Research Directions" (2006) (http://www3.imperial.ac.uk/pls/portallive/docs/1/55745699.PDF).

Guided waves can propagate in a structure in a number of different modes including torsional modes, and flexural and compressional modes. Torsional modes, in the form of shear horizontal waves, can be particularly useful for inspecting pipes while they are in use because little of the guided wave energy is coupled into the external media inside and outside the pipe.

Although shear horizontal waves can be used to measure average pipe thickness, shear horizontal waves have not been considered in industry to be particularly suited to detecting and determining the size of defects, such as reduced wall thickness arising from corrosion of an inner or outer diameter of the wall.

Lamb and shear horizontal waves near their cut-off frequencies to determine the presence pipe corrosion using transmission or reflection coefficients, or mode conversion phenomenon have been investigated in the laboratory.

For example, the use of mode cut off to identify and to obtain a thickness of a corroded region has been investigated experimentally as described in J. L. Rose & J. N. Barshinger: "Using Ultrasonic Guided Wave Mode Cutoff for Corrosion Detection and Classification", IEEE ULTRASONICS SYMPOSIUM, page 851 (1998), W. Zhu, J. L. Rose, J. N. Barshinger, V. S. Agarwal: "Ultrasonic Guided Wave NDT for Hidden Corrosion Detection", Research in Nondestructive Evaluation, pages 205 to 225 (1998) and D. Tuzzeo & F. Lanza di Scalea: "Noncontact Air-Coupled Guided Wave Ultrasonics for Detection of Thinning Defects in Aluminum Plates" volume 10, pages 61 to 77 (2001).

Mode conversion has also been observed experimentally as described in Nurmalia, N. Nakamura, H. Ogi, and M. Hirao: "Detection of Shear Horizontal Guided Waves Propagating in Aluminum Plate with Thinning Region", Japanese Hournal of Applied Physics, volume 50, pages 07HC17-1 to 07HC17-5 (2011), Nurmalia, N. Nakamura, H. Ogi, M. Hirao, K. Nakahata: "Mode conversion behaviour of SH guided wave in a tapered plate", NDT&E International, volume 45, pages 156 to 161 (2012) and P. Belanger: "High order shear horizontal modes for minimum remnant thickness", Ultrasonics, volume 54, pages 1079 to 1087 (2014).

Notwithstanding these laboratory investigations, these approaches have not been adopted in real-world guided waves inspection systems, not least because of a number of unknown variables which makes identification and characterisation of defects in a real-world structure (which can have any size of defects) more difficult.

SUMMARY

According to a first aspect of the present invention there is provided a method of determining a thickness ("a remaining thickness") of a region of a wall- or plate-like or -based structure (such as pipe, rectangular conduit or cylindrical vessel) which is thinner than a thickness of a surrounding region of the structure due to a cavity in the structure. The method comprises comparing a measured time-frequency dispersion map for at least one dispersive guided wave obtained by measuring the structure using guided waves with a reference time-frequency dispersion map obtained by modelling the cavity-free structure, determining a cut-off frequency at which the measured time-frequency dispersion map and the reference time-frequency dispersion map differ and calculating the remaining thickness in dependence upon the cut-off frequency.

The at least one dispersive guided wave is at least one shear horizontal guided wave of the higher order than one fundamental symmetric shear horizontal guided wave ($SH_0$), for example, a first-excited mode antisymmetric shear horizontal guided wave ($AH_1$).

The method may comprise obtaining the measured time-frequency dispersion map by, for a set of different frequencies, causing a transmitter transducer to excite the structure using a tone burst at a given frequency, receiving a time-varying signal from a receiver transducer and storing the time-varying signal.

The time-varying signal may include signals corresponding to one or more guided waves. The one or more guided waves may include at least one fundamental symmetric shear horizontal guided wave ($SH_0$) and/or at least one a first-excited mode antisymmetric shear horizontal guided wave ($AH_1$). The one or more guided waves may include at least one transmitted wave. The at least one transmitted wave may include periodically-detected wave (i.e. a wave which travels around a loop in a structure (such as pipe circumference) and which is detected each time the wave returns to a receiver transducer thereby resulting in two or more waves). The one or more guided waves may include at least one reflected wave.

Causing the transmitter transducer to excite the structure using the tone burst at the given frequency may cause a fundamental symmetric shear horizontal, $SH_0$, guided wave and a first-excited mode antisymmetric shear horizontal, $AH_1$, guided wave to be generated in the structure.

Modelling the structure may comprise generating the reference time-frequency dispersion map in dependence upon a thickness of the structure. Generating the reference time-frequency dispersion map may comprise calculating a time of flight as a function of frequency or vice versa dependent on guided wave mode number, a distance between a transmitter transducer and a receiver transducer, a thickness of a wall or plate of the structure and bulk shear velocity.

Modelling the structure may comprise, for a reference section of the structure (for example, a section of a pipe which is substantially free from defects or at least free from defects which are of interest), causing the transmitter transducer to excite the structure using a reference tone burst, receiving a reference time-varying signal from a receiver transducer and determining a distance between a transmitter transducer and a receiver transducer and a thickness of a wall or plate of the structure in dependence upon the reference time-varying signal.

The cavity is preferably a surface cavity, i.e. the cavity extends from a surface (which may be an outer surface or an inner surface) of the structure. For example, the cavity may be at the surface of a pipe.

The structure is preferably elongate, i.e. has a length which is greater than its transverse dimension (e.g. diameter). The structure preferably comprises a wall or plate which has a substantially uniform thickness. The wall or plate may have a curvature in a transverse direction (i.e. around a pipe circumference) which is preferably smooth, i.e. there are no abrupt changes in thickness or in orientation.

The wall- or plate-like structure may be a pipe comprising a pipe wall.

The method may be implemented in software, e.g. in a (programmable) computer system comprising memory and at least one processor. The method may be implemented, at least in part, in hardware. For example, an application-specific integrated circuit (ASIC) or field-programmable gate array (FPGA) may be used to carry out at least some of the steps of the method.

According to a second aspect of the present invention there is provided a computer program which, when executed by a computer system, causes the computer to perform the method.

According to a third aspect of the present invention there is provided a computer-readable medium, which may be a non-transitory computer-readable medium, storing the computer program.

According to a third aspect of the present invention is provided apparatus configured to compare a measured time-frequency dispersion map for at least one dispersive guided wave obtained by measuring the structure using guided waves with a reference time-frequency dispersion map obtained by modelling the cavity-free structure, to determine a cut-off frequency at which the measured time-frequency dispersion map and the reference time-frequency dispersion map differ and to calculating the thickness of the thinner region in dependence upon the cut-off frequency.

The apparatus may be a computer system comprising memory and at least one processor, and the at least one processor configured to compare a measured time-frequency dispersion map for at least one dispersive guided wave obtained by measuring the structure using guided waves with a reference time-frequency dispersion map obtained by modelling the structure, to determine a cut-off frequency at which the measured time-frequency dispersion map and the reference time-frequency dispersion map differ and to calculating the thickness of the thinner region in dependence upon the cut-off frequency.

For a set of different frequencies, the apparatus is configured to cause a transmitter transducer to excite the structure using a tone burst at a given frequency, to receive a time-varying signal from a receiver transducer and to store the time-varying signal so as to generate the measured time-frequency dispersion map.

The apparatus may be configured to cause a transducer to be mechanically adjusted so as to access a different range of wavelengths. The apparatus may be configured to cause spacing of elements in the transducer to change. For example, the apparatus may be configured to change spacing of elements in the transducer by an actuator, such as electric motor.

According to a fourth aspect of the present invention is provided a guided wave inspection system comprising the apparatus (e.g. the computer system), a transmitter comprising a transmitter transducer for exciting guided wave modes in the structure and a receiver comprising a receiver transducer for obtaining a time-varying signal.

The transmitter and receiver transducers may comprise respective transducers.

The transmitter transducer and receive transducer may comprise an electromagnetic acoustic transducer (EMAT) or first and second electromagnetic acoustic transducers (EMATs).

The transducer(s) may (each) comprise an array of spaced-apart transducer elements which are arranged such that spacing between the transducer elements is variably adjustable. For example, the transducer may comprise at least one linear bearing and at least one motor, for example in the form of a stepper motor. One or more transducer elements may be mounted on or to the linear bearing.

According to a fifth aspect of the present invention is provided a transducer for guided wave inspection comprising an array of spaced-apart transducer elements which are arranged such that spacing between the transducer elements is variably adjustable.

Thus, the transducer can be mechanically adjusted so as to access a different range of wavelengths.

The transducer(s) may (each) comprise an array of spaced-apart transducer elements which are arranged such that spacing between the transducer elements is variably adjustable. The transducer may comprise at least one linear bearing and at least one motor, for example in the form of a motor, such as a stepper motor. One or more transducer elements may be mounted on or to the linear bearing.

The transducer may be an electromagnetic acoustic transducer (EMAT) and the transducer elements comprise magnets, for example, in the form of permanent magnets and/or electromagnets.

The transducer may be configured such that the spacing is variable so as to take a value between a lower limit and an upper limit. The lower limit may lie in the range 1 mm to 10 mm and the upper limit may lie in the range to mm to 20 mm.

The transducer may be configured such that the spacing is variable so as to take a value between a lower limit and an upper limit, wherein the lower limit lies in a range between to mm and 30 mm and the upper limit lies in a range between 20 mm and 60 mm.

The transducer may include a linear actuator coupled to a motor and to at least one transducer element so as to vary spacing between the transducer elements.

The transducer may include two or more columns of transducer elements, wherein each column includes three or more transducer elements. One or more rows of transducer elements, each row comprising two or more transducer elements (one from each column), may be moved together.

BRIEF DESCRIPTION OF THE DRAWINGS

Certain embodiments of the present invention will now be described, by way of example, with reference to the accompanying drawings, in which:

FIGS. 27a and 27b illustrate, in top view, a second transducer arrangement for first and second magnet spacings respectively;

FIGS. 28a and 28b illustrate, in bottom view, a second transducer arrangement for first and second magnet spacings respectively; and FIGS. 29a and 29b illustrate, in perspective view, a second transducer arrangement for first and second magnet spacings respectively.

DETAILED DESCRIPTION OF CERTAIN EMBODIMENTS

Defect in Pipe

The purpose of a guided wave sensing system herein described is to detect and estimate the depth of support-type defects and other similar types of defects and flaws found in pipes used for carrying, for example, oil, gas, petrochemicals, other types of processed chemicals, water or coolants. These types of pipes can be found in a wide-range of industries and applications such as oil and gas extraction platforms, refineries, chemical plants, pipelines, power stations and other types of industrial plant and infrastructure.

Figure 1:
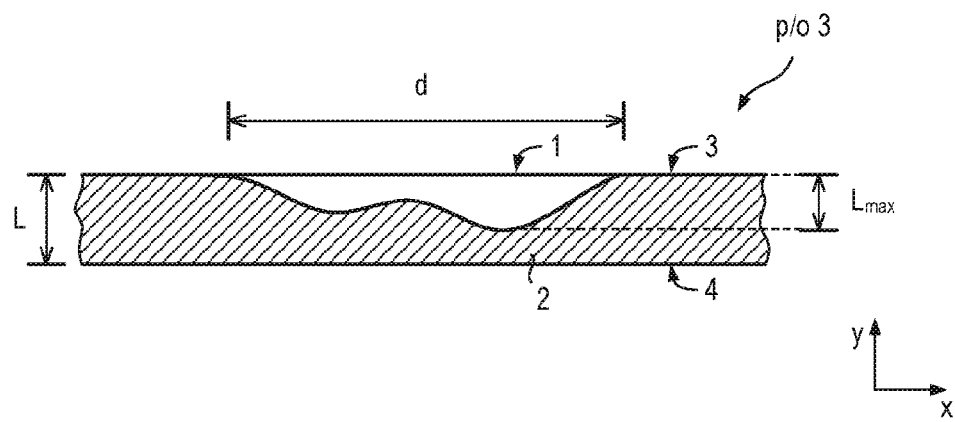
FIG. 1 is a cross-sectional view of a pipe wall and a defect in the pipe wall.

Referring to FIG. 1, a pipe defect 1 can take the form of a cavity or pit formed in the wall 2 of a pipe 3 resulting in a substantial reduction of wall thickness, L. A defect 1 can extend lengthwise and/or circumferentially by a distance, d, ranging from a few millimetres to a few hundreds of millimetres on the inside 4 or outside 3 of the pipe 3. The defect 1 can have a depth $L_{max}$ which can be X % of the original wall thickness, where 0<X<100. For example, a defect 1 can be relatively shallow, e.g. 0%<X %<50%, or relatively deep, 50%<X %<100%. The cavity can be filled with material which is different to that of the pipe wall 2. For example, the pipe wall 2 may be formed from steel and the cavity may be filled with rust.

Ultrasonic Guided Wave Shear Horizontal Sensing System

Figure 2:
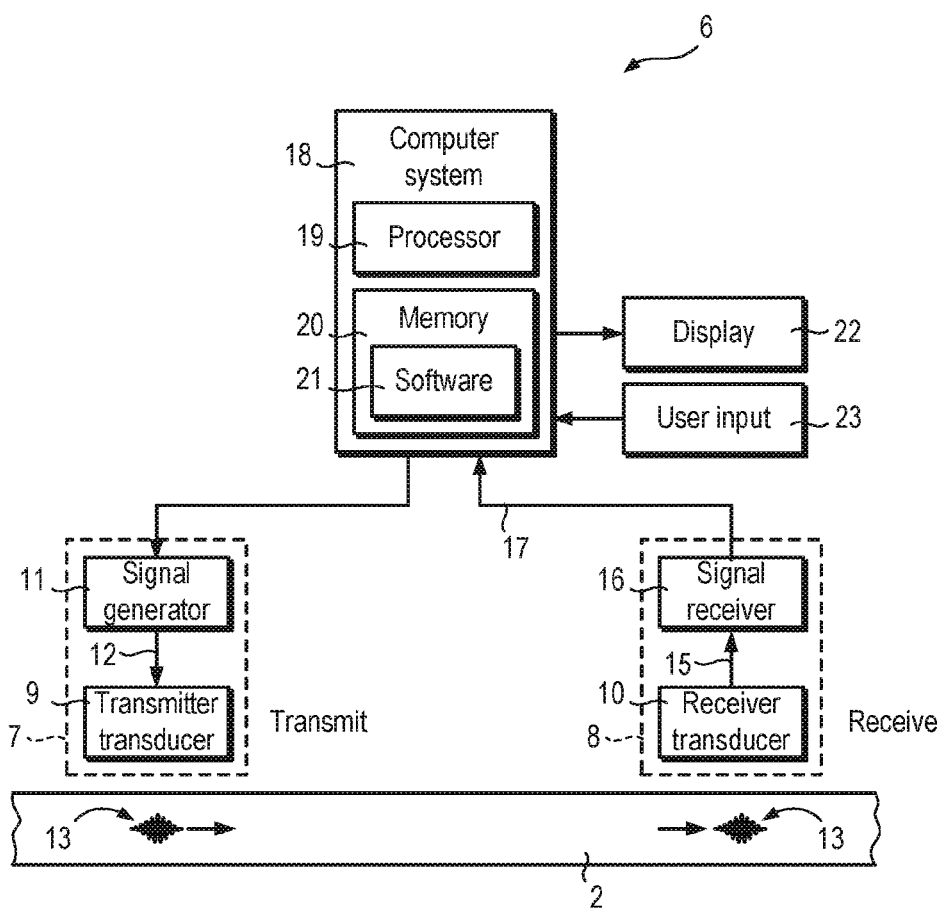
FIG. 2 is a schematic block diagram of a guided wave shear horizontal sensing system which can be used to screen a plate or pipe.

Referring to FIG. 2, a sensing system 6 employing guided waves is shown which can be used for detecting and sizing defects.

The system 6 includes a transmitter 7 and a receiver 8 comprising respective transducers 9, to capable of generating and detecting shear horizontal (SH) guided waves in a pipe wall 2. The transducers 9, to take the form of electromagnetic acoustic transducers (EMATs). However, other forms of transduction such as piezoelectric transduction can be implemented as well.

The system 6 includes a signal generator 11 capable of generating rf signals 12 having a suitable frequency, which is usually of the order of tens or hundreds of kilohertz (kHz), and a suitable shape, such as, for example, a n-cycle suitably-windowed tone burst, where n is a positive number equal to or greater than 1, preferably an integer or half integer, preferably taking a value in the range $3 \geq n \geq 10$, and where a suitable windowing function can be a Gaussian function. The signal generator 11 feeds the rf signal 12 to the transmitter transducer 9 which converts the signal 12 into a guided wave 13 in the pipe wall 2, for example, by Lorentz force and/or magnetostriction transduction. The guided wave 13 travels along the pipe wall 2 and may be transmitted and reflected at a discontinuity.

The receiver transducer 10 converts a (received) guided wave 13 into an electrical signal 15. The receiver transducer 10 feeds the electrical signal 15 to a signal receiver 16. The signal receiver 16 may include an amplifier (not shown) and an analogue-to-digital converter (not shown) which generates a digitized signal 17 of the electrical signal 15.

The system 6 includes a computer system 18 for controlling the signal generator 11 and processing signals 17 received from the signal receiver 16. The computer system 18 includes at least one processor 19 and memory 20 which stores software 21 for implementing a defect-detection and defect-sizing program.

The system 6 may also include a display 22, for example, to allow measurements to be displayed and one or more user input devices 23. The display 22 may take the form of a touch display which also provides user input.

The sensing system 6 is capable of automatically measuring pipe diameter and the pipe wall thickness, L. These two basic parameters are then used by the computer program in detecting defects and measuring their size.

Figure 3:
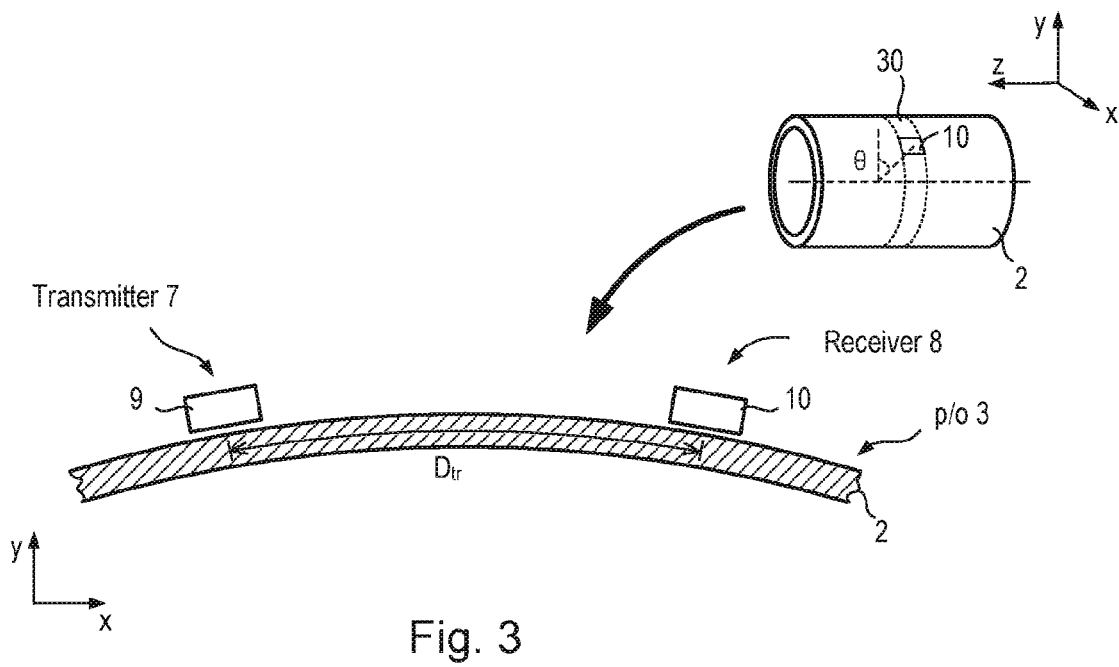
FIG. 3 is a partial transverse cross-section of a steel pipe and illustrates an arrangement in which a transmitter and a receiver of a sensing system are placed at different positions around the circumference of a pipe next to the outside of pipe.
Figure 14:
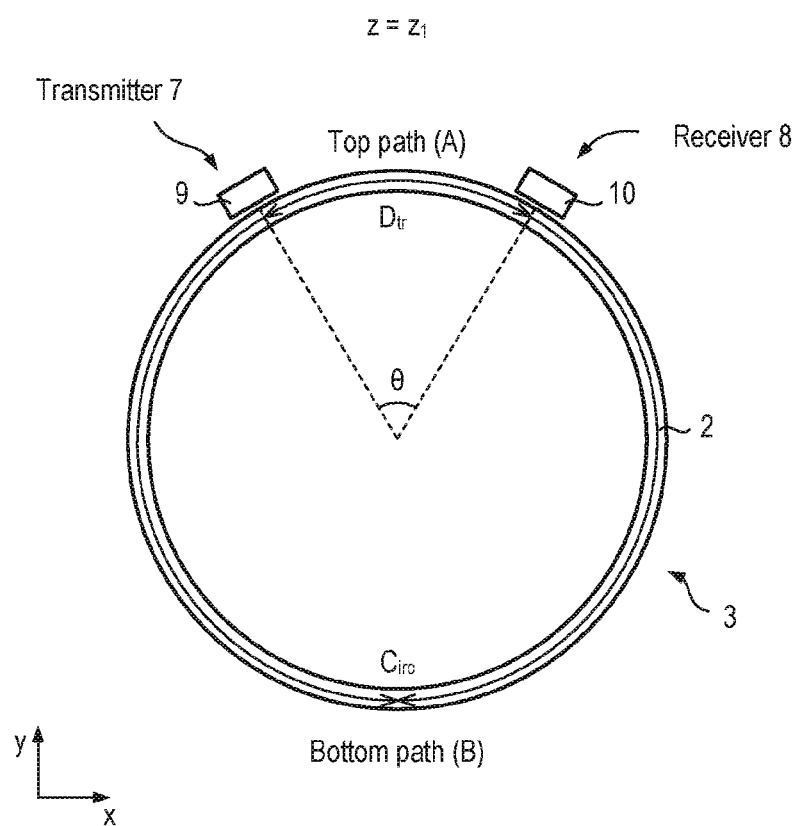
FIG. 14 illustrates a transmitter-receiver arrangement around the circumference of a pipe.

Calculating the Effective Path Length (the Distance) Between Transmitter and Receiver Referring also to FIGS. 3 and 14, the transducers 9, to are placed against or suitably close to the steel pipe wall 2 in an annular section 30 of the pipe 3 (in other words, at the same longitudinal position, z, along the pipe) at different angular positions (in other words, at different angular positions, θ, around the circumference of the pipe, as shown in FIG. 14).

Figure 4:
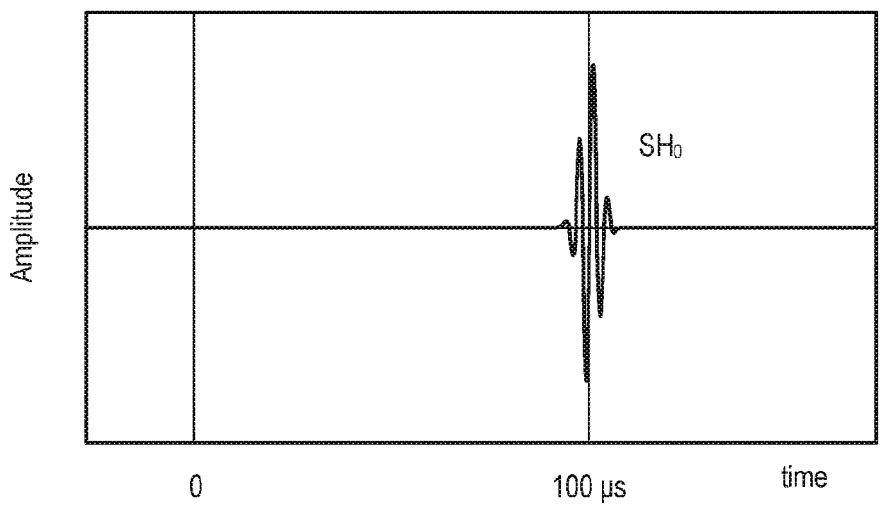
FIG. 4 is schematic time-domain plot of a fundamental shear horizontal mode ($SH_0$) tone burst which arrives at a receiver 100.0 μs after being generated by a transmitter in the arrangement shown in FIG. 3.

Referring also to FIG. 4, the transmitter 7 generates a fundamental shear horizontal mode ($SH_0$) guided wave tone burst propagating in the direction of receiver 8. The system 6 measures the time taken by the wave 13 to travel from the transmitter transducer 9 to the receiver transducer 10.

The effective path length (the distance), $D_{tr}$, between transmitter 7 and the receiver 8 can be calculated as:

$$D_{tr} = c \times T_{of} \tag{1}$$

where c is the speed of the $SH_0$ mode in steel and $T_{of}$ is the time of flight between transmitter 7 and the receiver 8.

For example, the transmitter 7 generates a short tone burst $SH_0$ signal at a time=0.00 µs. The receiver 8 picks up the tone burst at a time=100.0 µs. The speed, c, of the $SH_0$ mode in steel is 3250.0 m/s. If the system 6 measures the time of flight $T_{of}$ to be 100.0 µs, then, using equation (1) above, the system 6 can calculate the effective path length (the distance), $D_{tr}$, between the transmitter 7 and receiver 8 to be 325.0 mm.

Calculating Pipe Wall Thickness

Figure 5:
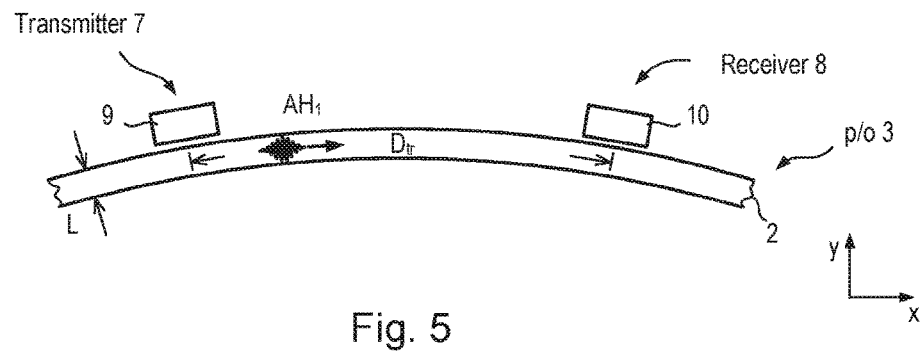
FIG. 5 is a partial transverse cross-section of a steel pipe and illustrates an arrangement in which a transmitter and a receiver of a sensing system are placed at different positions around the circumference of a pipe next to the outside of pipe similar to that shown in FIG. 3.

Referring to FIG. 5, the transducers 9, to are placed some distance apart and facing each other along the circumference of the steel pipe.

Figure 6:
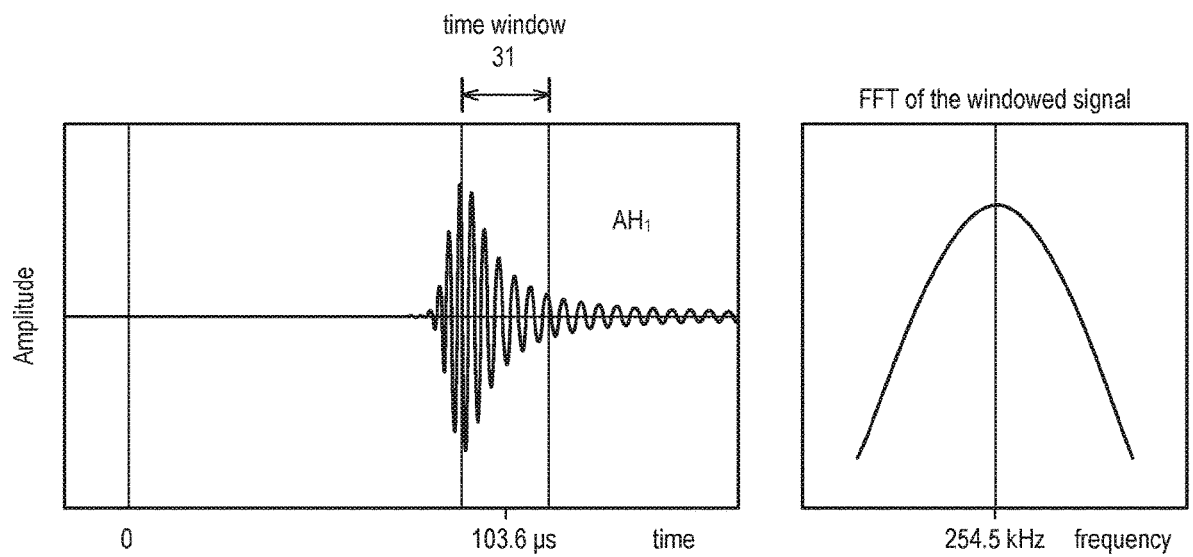
FIG. 6 is schematic time-domain plot of a dispersive, anti-symmetric shear horizontal mode ($AH_1$) tone burst and a corresponding Fourier transformation of a windowed signal centred around 103.6 μs and illustrating a dominant frequency of the windowed signal as being 254.5 kHz.

Referring also to FIG. 6, the transmitter 7 generates a dispersive shear horizontal mode $SH_n$ (where n is a positive integer) tone burst wave propagating in the direction of the receiver 8. The time taken by the wave to travel from transmitter transducer 9 to receiver transducer 10 and the dominant frequency of the received signal are measured by the system 6 (FIG. 2).

The group velocity for the measured frequency of the $SH_n$ mode can be obtained using:

$$\upsilon = D_{tr}/T_{of} \tag{2}$$

where $D_{tr}$ is the effective path length (the distance), between the transmitter transducer 9 to the receiver transducer to and $T_{of}$ is the time of flight taken for the wave to travel between the transmitter transducer 9 to the receiver transducer 10.

Using the dispersion equation, the thickness, L, of the pipe wall 2 can be calculated using $$L = nc^2/(2f\sqrt{(c^2 - \upsilon^2)}) \tag{3}$$

where $\upsilon$ is the group velocity of the $SH_n$ tone burst, f is the dominant frequency of the $SH_n$ tone burst, c is the bulk shear velocity in steel, and n is mode number, where n=1, 2, ... .

For example, the $AH_1$ tone burst signal travels from the transmitter 7 to the receiver 8. The transducers 9, 10 are placed at the distance $D_{tr}$=185.5 mm apart.

The system 6 (FIG. 2) selects the part of the $AH_1$ tone burst within a time window 31 centred at $T_{of}$=103.6 µs. The system 6 takes the fast Fourier transform (FFT) of the windowed signal and finds the dominant frequency f=254.5 kHz.

Using equation (2) above, the group velocity, $\upsilon$, of the $AH_1$ mode (that is, for n=1) associated with this frequency can be obtained as $\upsilon$=185.5/103.6=1790.5 m/s. Bulk shear velocity, c, in steel is 3250 m/s. Using equation (3) above the system 6 can calculate the pipe wall thickness, L, as being 7.65 mm.

Calculating Depth of the Defect Using Reflected Waves

Figure 7:
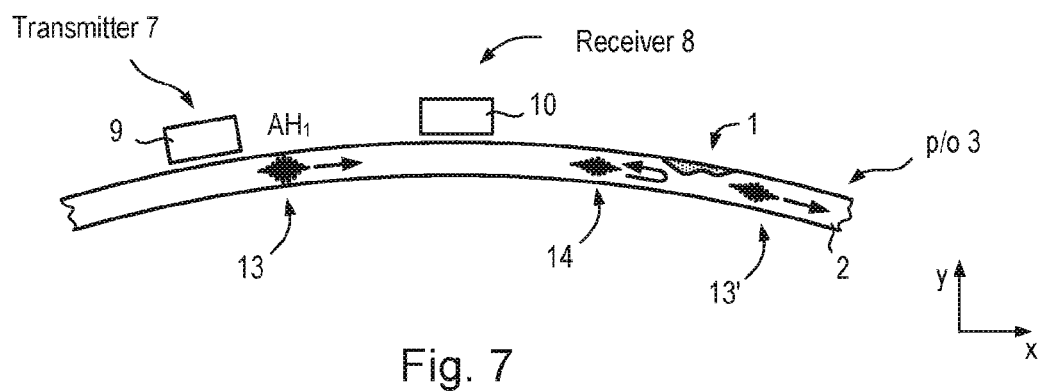
FIG. 7 illustrates a first transmitter-receiver arrangement, similar to that shown in FIG. 5, in which a receiver is interposed between a transmitter and a pipe defect.

Referring to FIG. 7, the transducers 9, to are positioned some distance apart and facing each other along the circumference of the pipe 3. The receiver transducer to is situated between the transmitter transducer 9 and the defect 1.

Figure 8:
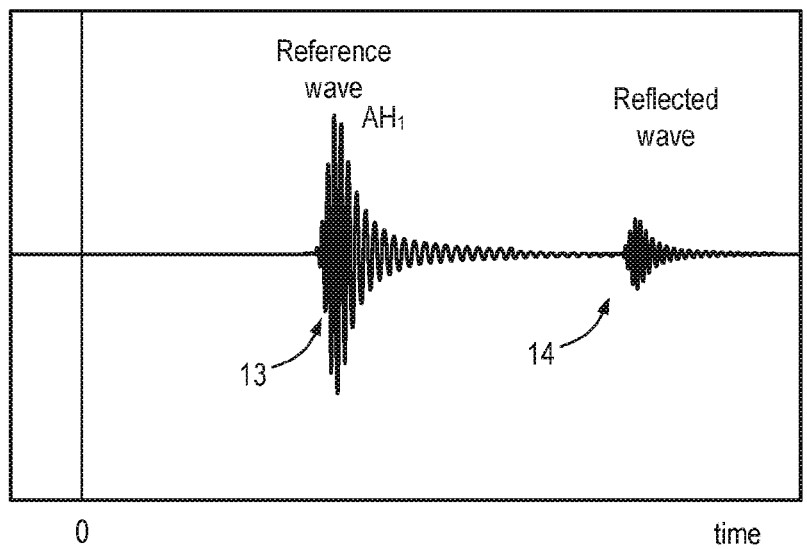
FIG. 8 is a schematic time-domain plot of a transmitted dispersive, anti-symmetric shear horizontal mode ($AH_1$) and its reflection from a defect in the first arrangement shown in FIG. 7.

Referring also to FIG. 8, the transmitter 7 generates an $AH_1$ mode tone burst. The travelling $AH_1$ wave is picked by the receiver 8. The wave 13 travels further and is reflected by the defect 1. The reflected wave 14 is subsequently picked up by the receiver 8. The time domain view of the signal is shown in FIG. 8.

Figure 9:
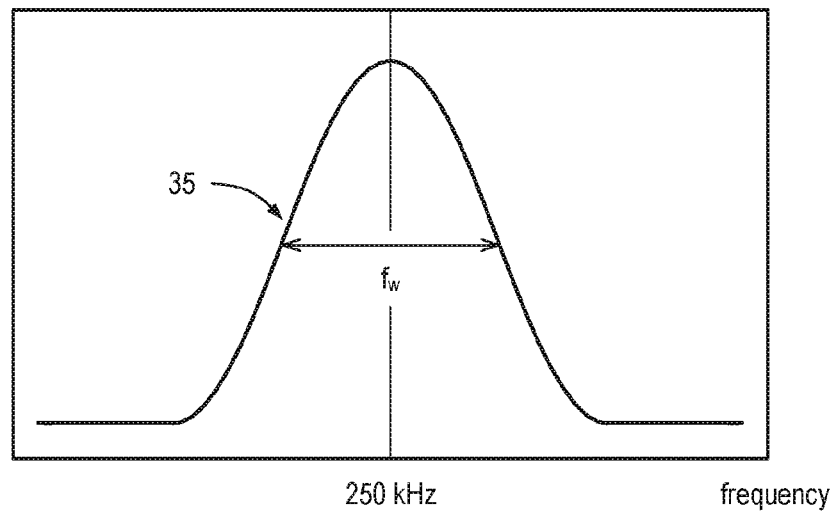
FIG. 9 is a schematic plot of a fast Fourier Transform of a reference $AH_1$ signal shown in FIG. 8.
Figure 10:
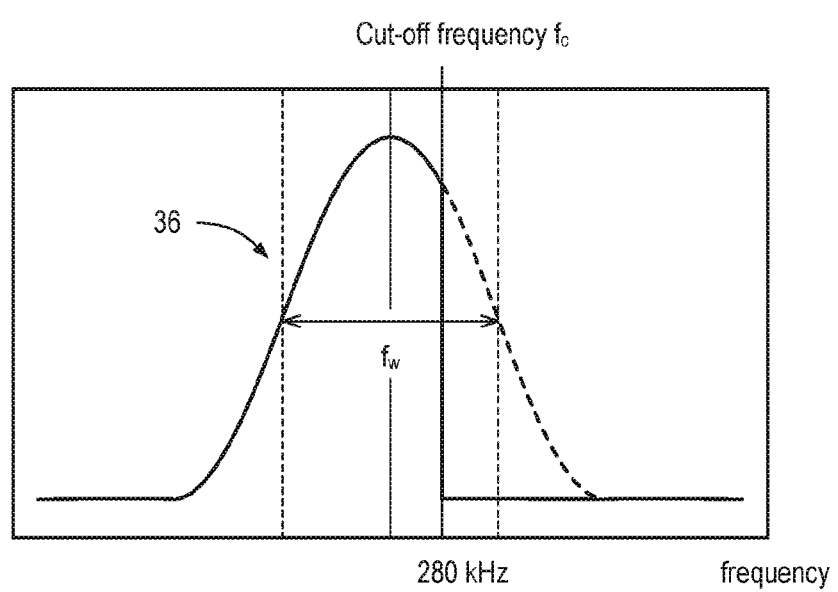
FIG. 10 is a schematic plot of a fast Fourier Transform of a signal shown in FIG. 8 reflected from a defect, where $f_c$ is a cut-off frequency of the reflected signal.

Referring to FIGS. 9 and 10, the Fourier transforms 35, 36 of the original $AH_1$ signal and the reflected signal are shown.

The reflected signal 14 has a different frequency composition from that of the original signal 13. Specifically, higher frequency content will be significantly attenuated above a specific cut-off frequency, ft.

The system 6 calculates a minimum wall thickness, $L_{min}$, under the defect 1 using:

$$L_{min} = c/2f_c \tag{4}$$

where c is the bulk shear velocity in steel and $f_c$ is the cut-off frequency of the reflected signal.

For example, the shear wave velocity, c, in steel is 3250.0 m/s. If the cut-off frequency, $f_c$, is measured as 280.0 kHz (see FIG. 1o), then, using equation (4) above, the system 6 determines the minimum wall thickness, $L_{min}$, to be 5.8 mm. If the pipe wall thickness is 7.7 mm then the depth of the defect is 7.7−5.8=1.9 mm.

Calculating Depth of the Defect Using Transmitted Waves

Figure 11:
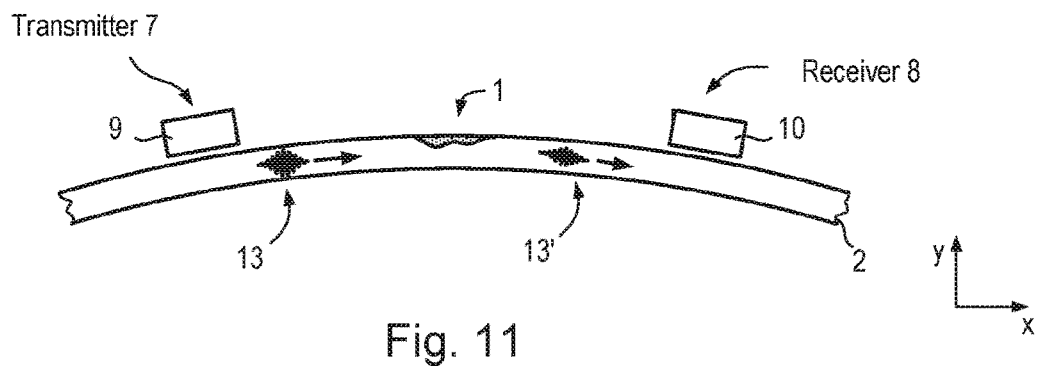
FIG. 11 illustrates a second transmitter-receiver arrangement, similar to that shown in FIG. 5, in which a defect is interposed between a transmitter and a receiver.

Referring to FIG. 11, the transducers 9, 10 are positioned some distance apart and facing each other along the circumference of the steel pipe 2. The defect 1 is situated between the transmitter transducer 9 and the receiver transducer 10.

Figure 12:
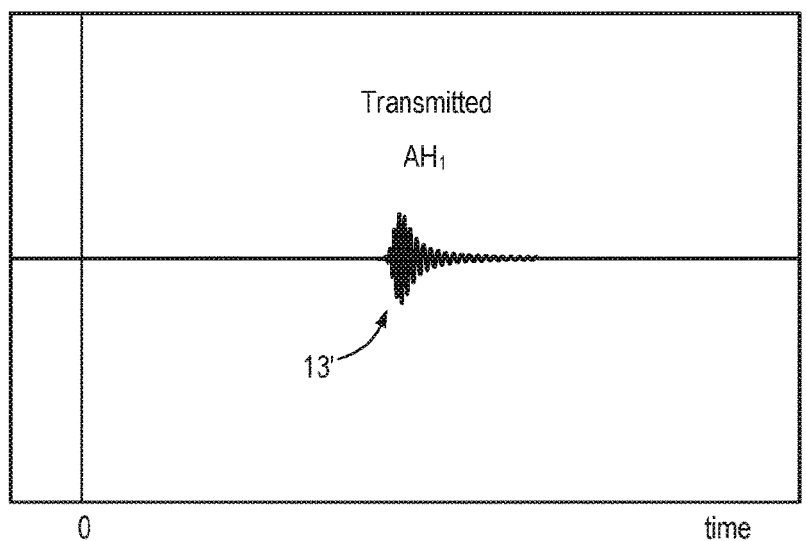
FIG. 12 is a schematic time-domain plot of a transmitted dispersive $AH_1$ signal in the second arrangement shown in FIG. 11.

Referring to FIG. 12, the transmitter 7 generates a dispersive $AH_1$ mode tone burst 13. The travelling wave crosses the defective zone and the transmitted wave 13' is picked by the receiver 8.

Figure 13:
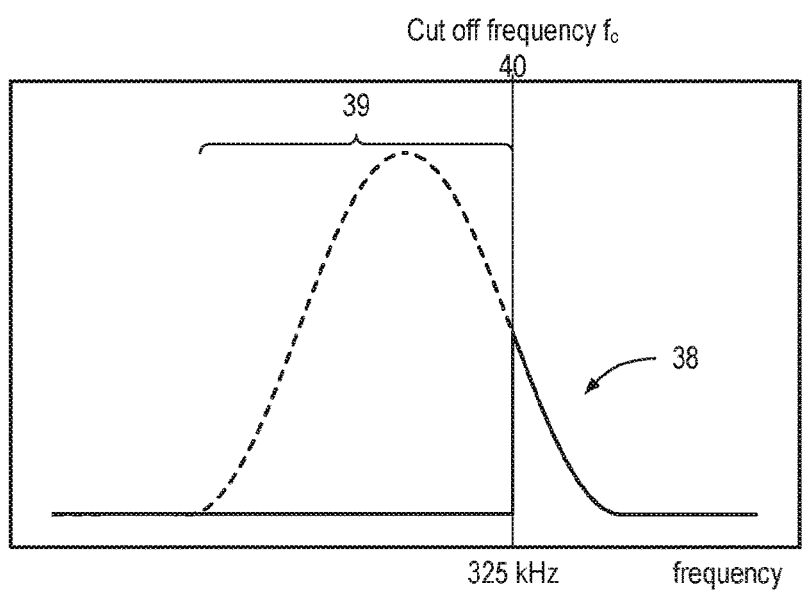
FIG. 13 is a schematic plot of a fast Fourier Transform of a signal shown in FIG. 12 transmitted through the defect, where $f_c$ is a cut-off frequency of the reflected signal

Referring also to FIG. 13, the Fourier transform 38 of the transmitted signal 13 of FIG. 12 is shown. The wave travelling through the defect area loses some of the lower frequency components 39. Below a certain cut-off frequency 40, the signal is attenuated.

The system 6 (FIG. 2) calculates the minimum wall thickness, $L_{min}$, under the defect 1 as:

$$L_{min} = c/2f_c \quad (5)$$

where c is the bulk shear velocity in steel and $f_c$ is the cut-off frequency of the reflected signal.

For example, the bulk shear wave velocity in steel is assumed to be 3250.0 m/s. If the system 6 (FIG. 2) finds that $f_c$ is 325.0 kHz (FIG. 13), then, using equation (5) above, the system 6 calculates the minimum wall thickness $L_{min}$ to be 5.0 mm. If the pipe wall thickness is 7.7 mm then the depth of the defect is 7.7−5.0=2.7 mm.

Defect Sizing Process

Referring to FIG. 14, an arrangement of a transmitter 7 and a receiver 8 around a pipe 3 is shown.

Pipe Circumference

The transmitter 7 is arranged to generate shear waves in the pipe wall 2 propagating around the pipe circumference. The transmitter 7 generates a $SH_0$ mode tone burst wave which is picked up by the receiver 8.

Figure 15:
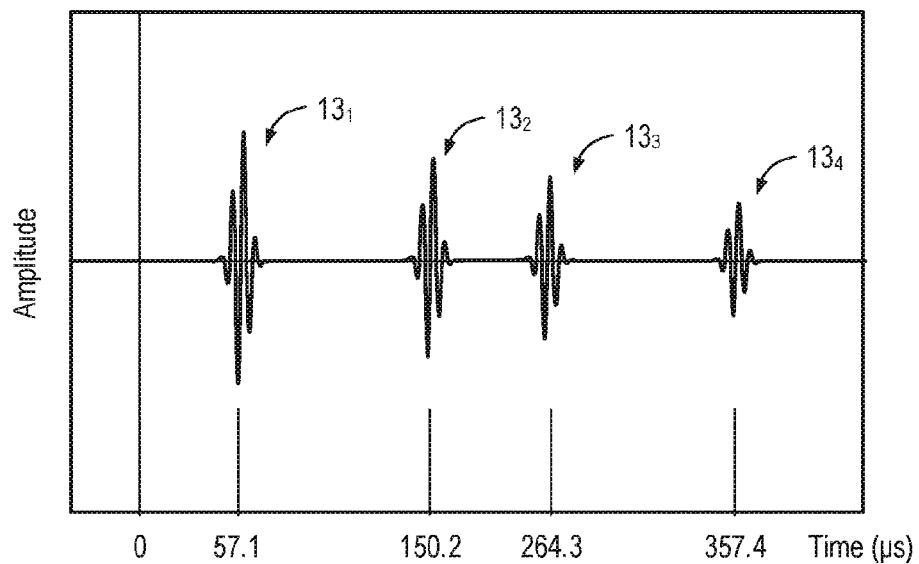
FIG. 15 is a schematic plot of non-dispersive $SH_0$ wavelets travelling around the circumference of a pipe in clockwise and anticlockwise directions.

Referring also to FIG. 15, multiple, round-trip wavelets $13_1$, $13_2$, $13_3$, $13_4$ travelling circumferentially in the clockwise and anticlockwise directions are detected by the system 6 and, based on time of flight, are used to calculate accurately the effective path length (the distance), $D_{tr}$, between transmitter transducer 9 and the receiver transducer to and also pipe circumference, $C_{irc}$.

Both variables $D_{tr}$ and $C_{irc}$ are measured by the system 6 (FIG. 2) to a precision equal to or less than 0.1 mm.

Pipe Wall Thickness

Using the dispersion properties of higher-order modes, the system 6 (FIG. 2) accurately measures the pipe wall thickness using a time-frequency decomposition of measured signals. For practical purposes, the system 6 (FIG. 2) uses the non-dispersive $SH_0$ mode and the first dispersive mode $AH_1$, that is, modes number n=0 and n=1 of equation (3).

Figure 16:
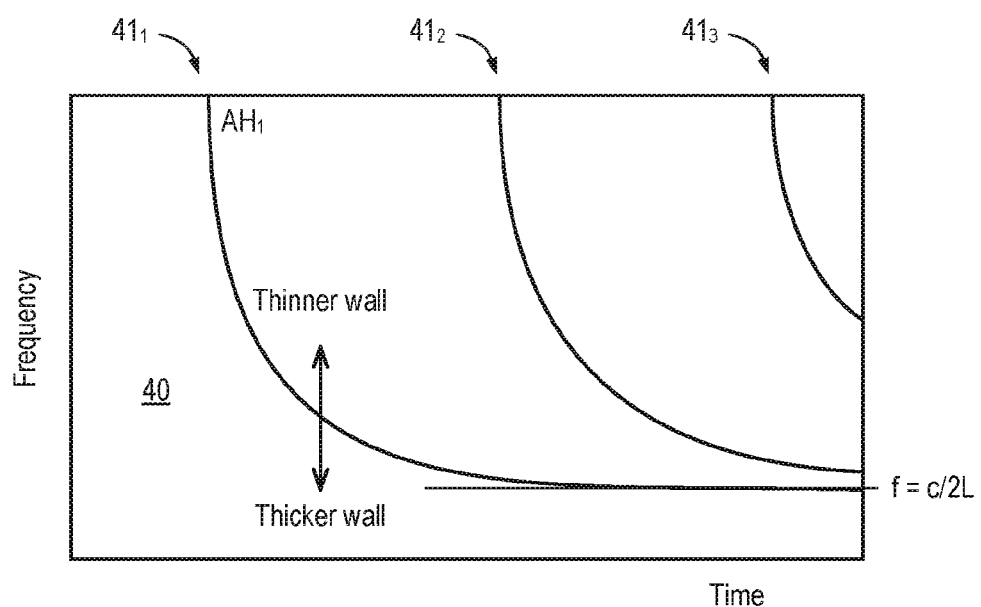
FIG. 16 is a schematic time-frequency plot of dispersive AH1 mode travelling around the circumference of a pipe.
Figure 17A:
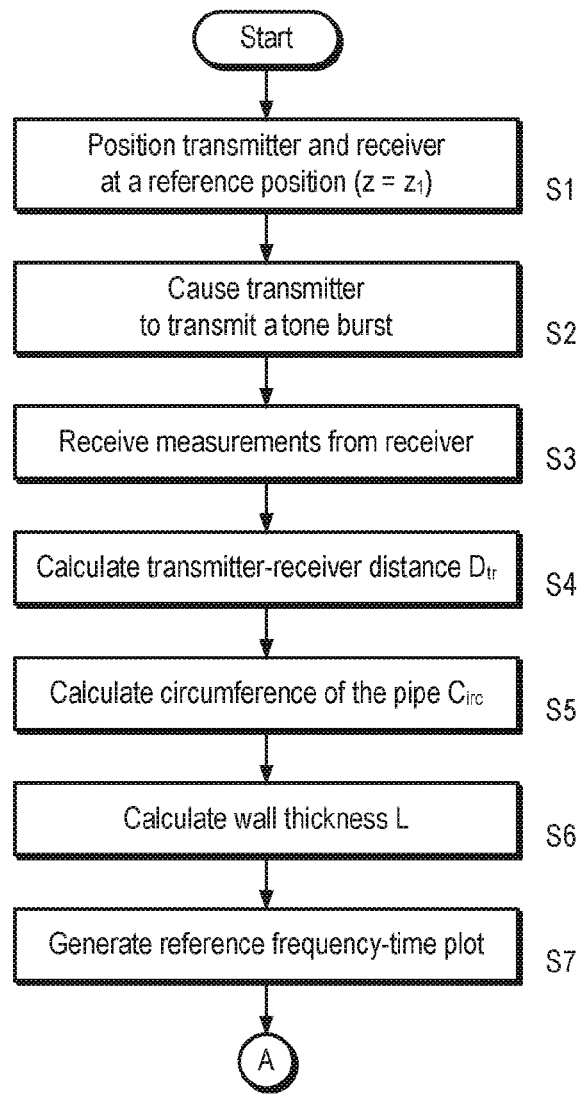
FIG. 17a is a process flow diagram of a first part of method of determining depth of a defect.
Figure 17B:
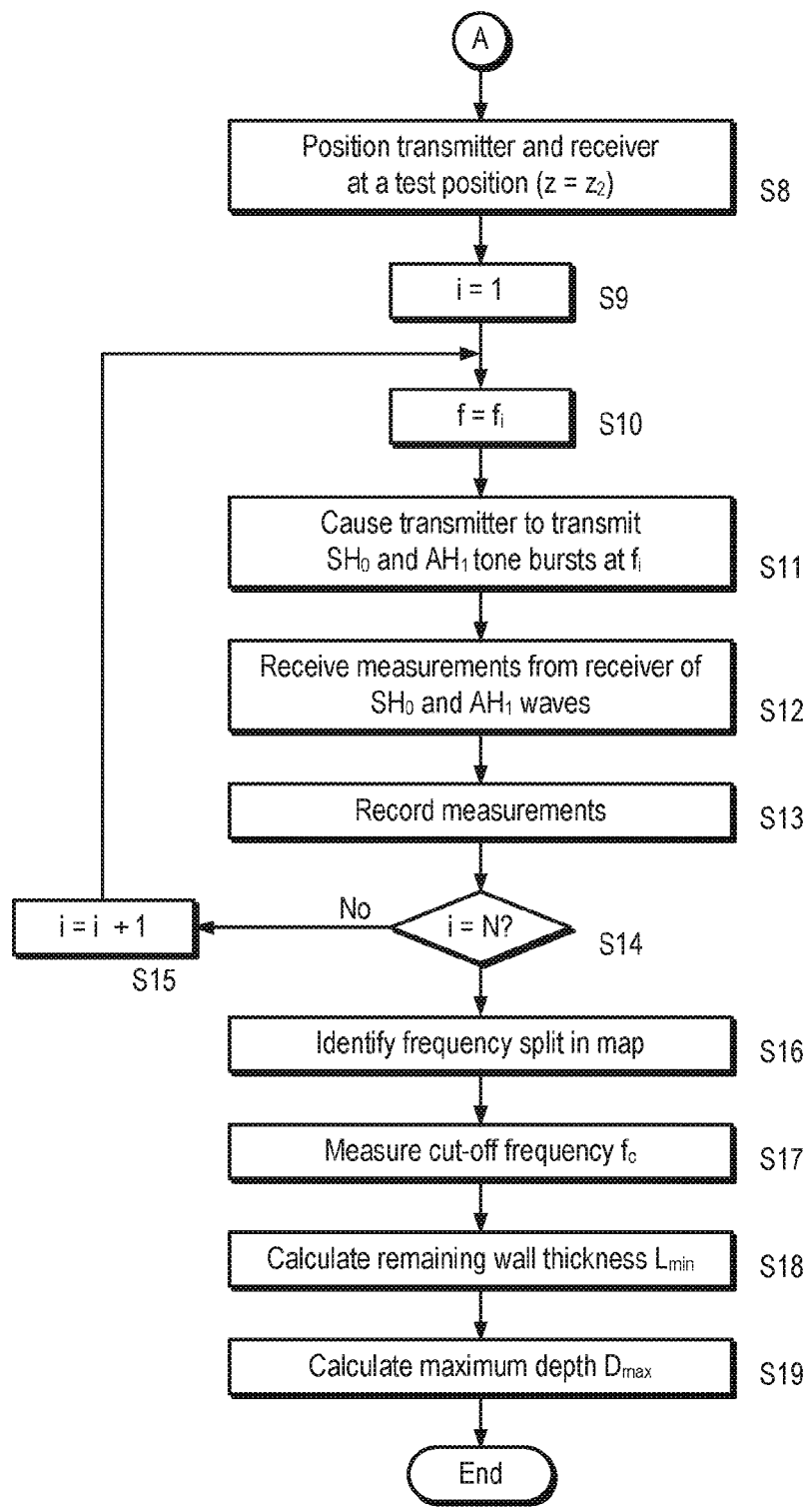
FIG. 17b is a process flow diagram of a second part of method of determining depth of a defect

Referring also to FIG. 16, the system 6 (FIG. 2) can generate a predicted (or "theoretical") time-frequency map 40 (herein also referred to as "setting-up a time-frequency map") for the pipe given the measured values of transmitter-receiver distance, $D_{tr}$, pipe circumference $C_{irc}$, and the pipe wall thickness, L, as will now be described in more detail.

Setting Up a Time-Frequency Map

Referring also to FIG. 14, the transmitter 7 and receiver 8 are set up on the pipe 3 around the pipe circumference. Circumferential distances A, B between the transmitter 7 to receiver 8 can be measured along top and bottom paths respectively.

The pipe circumference C can be calculated as:

$$C = A + B \quad (6)$$

For example, referring also to FIG. 15, using the time-of-flights for first and second wavelets $13_1$, $13_2$ and the bulk shear wave velocity of 3250 $ms^{-1}$, the circumferential distances for the top and bottom paths can be determined to be A=57.1×3250=185.5 mm and B=150.2×3250=488.0 mm respectively and so the circumference C=A+B=673.5 mm.

Equation (3) above can be re-arranged to give:

$$\tau = c\sqrt{(1-(nc/2fL)^2)} \quad (7)$$

Therefore, the time-of-arrival of a wavelet can be calculated as:

$$t = D/v = D/(c\sqrt{(1-(nc/2fL)^2)}) \quad (8)$$

where D is the path length between transmitter 7 and receiver 8.

D can be the top path A, the bottom path B or the multiple circumferential paths, i.e.:

$$D = A, B, A+C, B+C, A+2C, B+2C, \quad (9)$$

For example, to generate time-frequency curve of the $AH_1$ mode (i.e. for mode n=1) for the top path, the system 6 (FIG. 2) uses equation (8) above and the values of n, D, A and c, as shown in FIG. 16. For n=1, D=A=185.5 mm, and c=3250 $ms^{-1}$:

$$t = 185.5/(3250\sqrt{(1-(3250/2fL)^2)}) \quad (10)$$

The system 6 generates $AH_1$ mode curves for other circumferential paths A, B, A+C, B+C, A+2C, B+2C etc. using equation (8) and obtains a family of time-frequency curves as shown in FIG. 16.

The position of the $AH_1$ curves $41_1$, $41_2$ $41_3$ on this time-frequency map 40 is determined by the pipe wall thickness, L. For larger values of pipe wall thickness, L, the $AH_1$ curves are shifted down, while for smaller values of pipe wall thickness, L, the $AH_1$ curves are shifted up.

The system 6 (FIG. 2) calculates pipe wall thickness, L, using a number of points using equation (3) along the $AH_1$ lines on the time-frequency map 40. Typically, the wall thickness is measured to within a small fraction of a millimeter.

In general, time-frequency curves can be calculated for any $SH_n$ mode in the pipe 3, using equation (8), for n=0, 1, 2, . . . etc.

The system 6 (FIG. 2) generates families of time-frequency curves associated with $SH_0$, $AH_1$ and higher modes and creates the reference time-frequency map (FIG. 19) which is then used by the system 6 (FIG. 2) to detect and evaluate defects 1.

Detecting Support-Type Defects

Referring to FIGS. 2, 14 and 17 to 19, to detect and determine the depth of a defect 1, a multiple step process is used.

First, the system 6 is used to inspect a defect-free section of the pipe 3.

The transmitter 7 and receiver 8 are positioned in a reference section of a pipe 3 along its circumference (step S1) and the computer system 18 causes the transmitter 7 to transmit $SH_0$, $AH_1$ or higher modes' tone bursts at one or more frequencies (step S2). If necessary, higher-order modes can be chosen.

Figure 18:
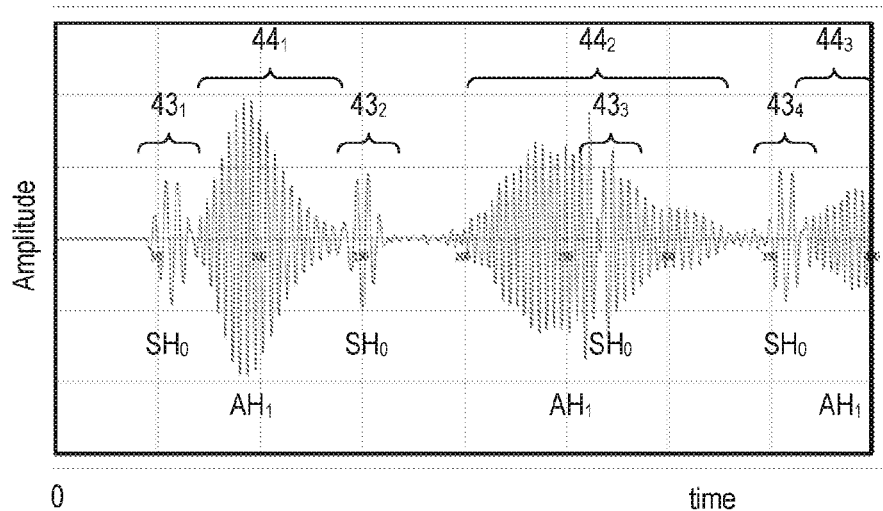
FIG. 18 is schematic time-domain plot of $SH_0$ and $AH_1$ modes travelling around the circumference of a pipe without a defect.

The computer system 18 receives measurements of $SH_0$, $AH_1$ or higher modes from the receiver 8 (step S3). An illustrative time-domain response is shown in FIG. 18 which includes received $SH_0$ wavelets $43_1$, $43_2$, $43_3$ and $AH_1$ wavelets $44_1$, $44_2$, $44_3$.

The computer system 18 uses the measurements to calculate the transmitter-receiver distance, $D_{tr}$, the pipe circumference, $C_{irc}$, and wall thickness, L (steps S4, S5 & S6).

In many practical applications, the system 6 firstly generates only $SH_0$ mode using frequency tone burst below the $AH_1$ cut-off to accurately calculate the transmitter-receiver distance, $D_{tr}$ and the pipe circumference, $C_{irc}$. Subsequently the system 6 uses higher frequencies to generate higher modes in order to measure wall thickness, L.

Figure 19:
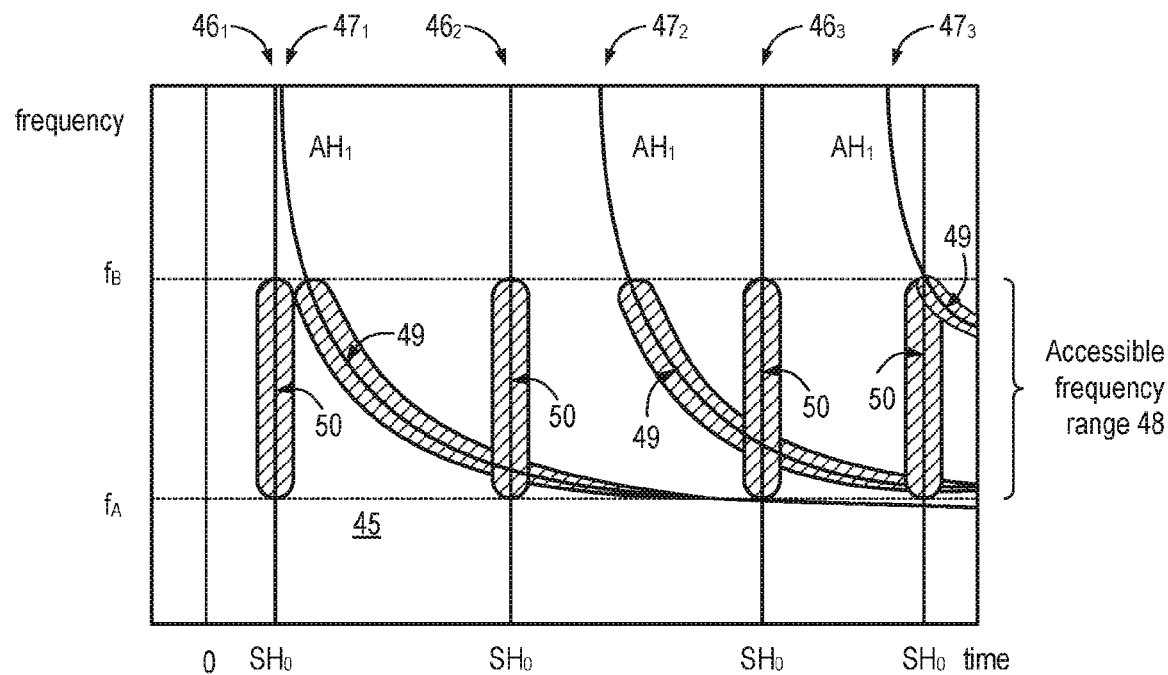
FIG. 19 is a schematic plot of frequency against time of the $SH_0$ and $AH_1$ modes travelling around a circumference of a pipe without a defect.

Referring in particular to FIG. 19, the computer system 18 generates a reference time-frequency map 45 (step S7). The time-frequency map 45 includes lines $46_1$, $46_2$, $46_3$ corresponding to $SH_0$ modes and curves $47_1$, $47_2$, $47_3$ corresponding to $AH_1$ modes. It will be appreciated that the time-frequency map 45 need not be actually displayed, but can simply be stored in memory.

The system 6 is able to probe (or "access") a range 48 of frequencies between first and second frequencies $f_A$, $f_B$. Thus, the system is about to probe sections 49, 50 of the lines $46_1$, $46_2$, $46_3$ and curves $47_1$, $47_2$, $47_3$ (i.e. the sections 49, 50 of the lines and curves in the hatched areas). The system 6 may be able to sweep the frequency range 48 electronically. However, as will be explained in more detail later, the system 6 may use a different set of transducers with a different spacing of elements or transducers in which it is possible to controllably vary spacing of elements so as to access wider wavelength range and, thus, access a broader aggregate frequency range.

Having established a predicted time-frequency map 45, the system 6 is used then to inspect a section of the pipe 3 for defects.

Figure 20:
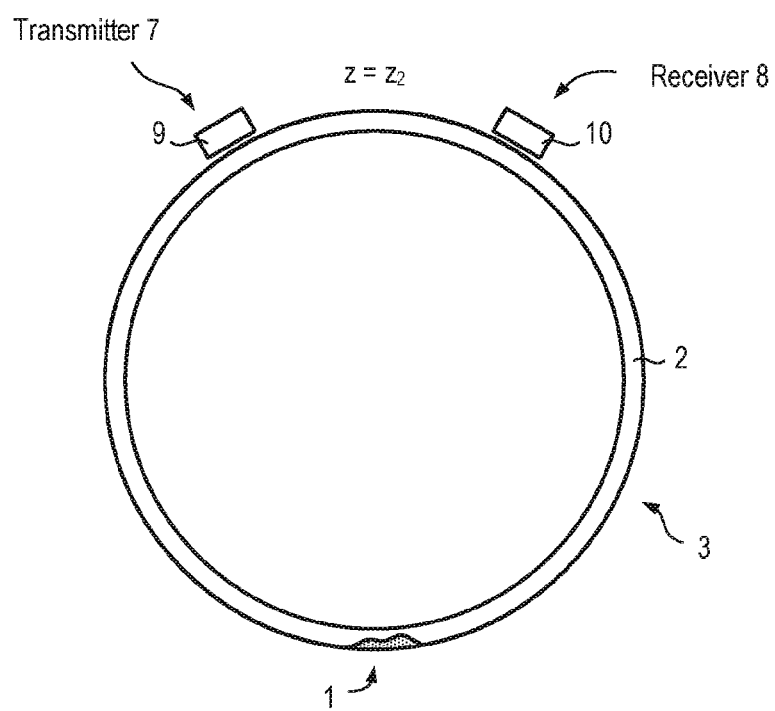
FIG. 20 illustrates a transmitter-receiver arrangement around the circumference of a pipe and a support-type defect.

Referring also to FIG. 20, the transmitter 7 and receiver 8 are positioned in a section of the pipe 3 under test along its circumference (step S8). Although defects 1 can be located in lower parts of the pipe 3, e.g. due to pipe supports, they can be found anywhere around the pipe 3.

Starting with a first frequency, e.g. at the lower end of the range, the system 6 probes the pipe 3 across a range of frequencies (step S9 & S10)

The computer system 18 causes the transmitter 7 to generate the required modes, in this case, a $SH_0$ wave and an $AH_1$ wave using a tone burst at a frequency $f_i$ (step S10). The computer system 18 receives and stores measurements of $SH_0$ and $AH_1$ from the receiver 8 (steps S11 & S12).

The computer system 18 may continue to probe the pipe at different frequencies until measurements for the complete range of frequencies have been acquired (steps S13 & 814), in case when, it might be necessary to analyse higher order modes. Thus, the computer system 18 effectively constructs a measured time-frequency map 51.

Figure 21:
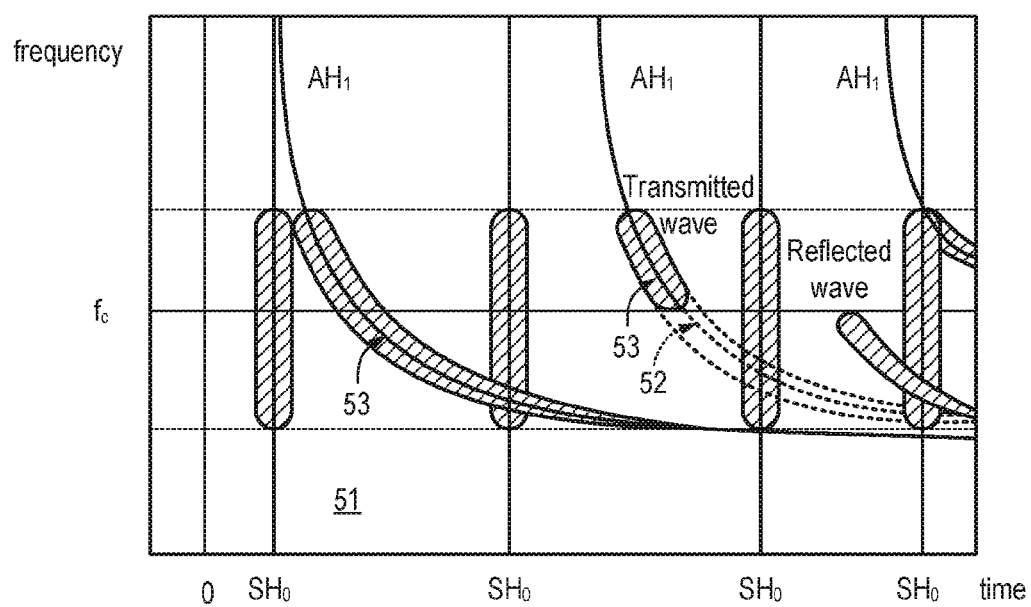
FIG. 21 is a schematic plot of frequency against time of the $SH_0$ and $AH_1$ modes travelling around a circumference of a pipe with a defect, such that the $AH_1$ passes through the defect and reflection and transmission occurs, wherein the system measures the cut-off frequency $f_c$ and, thus, calculates minimum remaining wall thickness $L_{min}$.

Referring also to FIG. 21, some $AH_1$ curves appear in different positions on the time-frequency map. As the dispersive mode wave passes over the defect 1, a frequency split may take place between the reflected and transmitted waves so that specific patterns can be observed on the time-frequency map.

These different patterns, in particular the cut-off frequency split between the reflected and transmitted signals, are used by the system 6 to calculate the maximum depth, $D_{max}$, of the defect 1.

The computer system 18 identifies the frequency split and calculates the cut-off frequency $f_c$ (see FIG. 21). The minimum remaining wall thickness is calculated using:

$$L_{min} = C/2f_c \qquad (11)$$

where c is the bulk shear velocity in steel and $f_c$ is the frequency at which the split between reflected and transmitted signal takes place. The computer system 18 can then calculate the maximum depth, $D_{max}$, of the defect 1 using:

$$D_{max} = L - L_{min} \qquad (12)$$

For example, the pipe wall thickness L is 7.7 mm and the split frequency, $f_c$, is 325.0 kHz. Using equation (6) above, the minimum wall thickness $L_{min}$ is 5.0 mm and, using equation (7) above, the system 6 calculates the maximum depth of the defect $D_{max}$ to be 7.7−5.0=2.7 mm.

The computer system 18 compares the measured time-frequency map 51 with the predicted time-frequency map 45 to identify missing and/or shifted portions 52 of $AH_1$ curves 53 (step S15) and, if found, identifies the split frequency $f_c$ (step S16).

Using the split frequency $f_c$, the computer system 18 is able to calculate the minimum remaining wall thickness (step S17) and, this, the maximum depth (step S18).

Transducer

To detect and successfully size defects, the transducers 9, to cover a sufficiently wide range of frequencies and corresponding wavelengths. Such a requirement can pose a challenge for multi-element type transducers, such as periodic permanent magnets EMAT transducers, which might only support a narrow range of the wavelengths.

Figure 22:
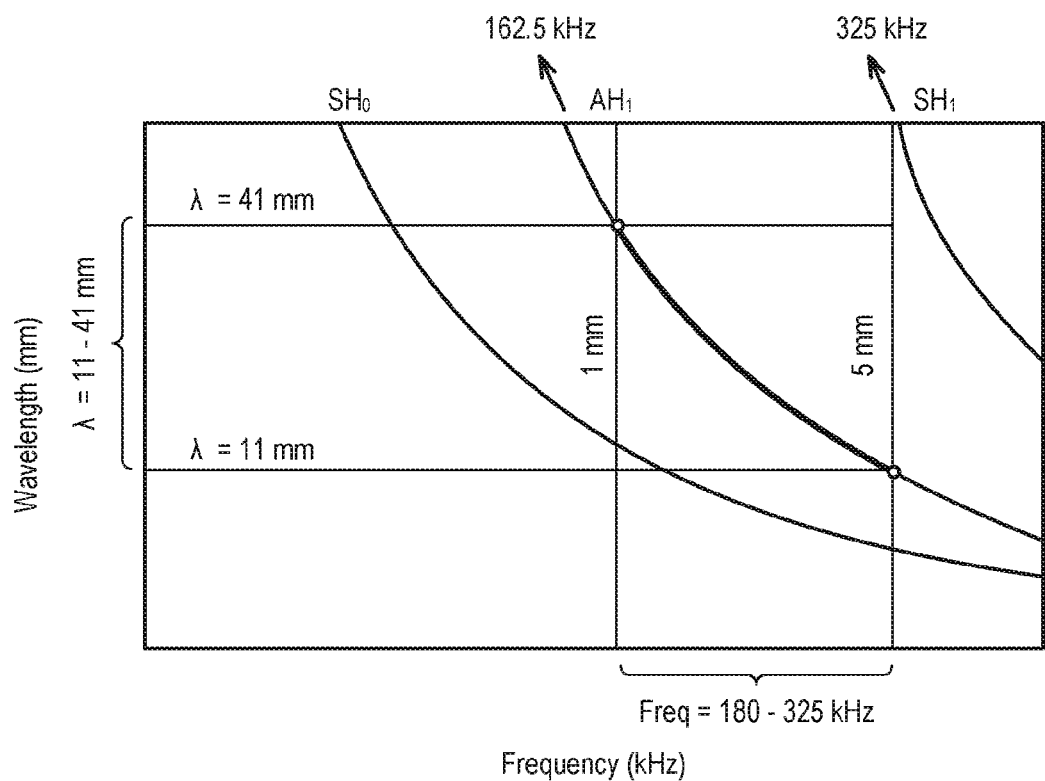
FIG. 22 is a schematic plot of wavelength against frequency for $SH_0$, $AH_1$ and $SH_1$ modes travelling circumferentially around a pipe having a wall thickness of to mm and illustrating a probe frequency range of 180 to 325 kHz and a wavelength range of 11 to 41 mm to detect defects extending 1 to 5 mm into the pipe wall.

Referring to FIG. 22, a dispersion map is shown for shear horizontal Lamb waves propagating circumferentially in a 203.2-mm (8-inch) diameter pipe having a wall thickness of 10 mm. The wave dispersion is computed as a relationship of wave frequency versus its wavelength for the $SH_0$, $AH_1$ and $SH_1$ modes.

Using equation (7) above, for a pipe having a wall thickness, L, of 10 mm, if the system 6 is to be able to measure a maximum defect depth, $D_{max}$, in a range between 1 and 5 mm, then the transducers 9, to should be able to generate and detect $AH_1$ waves in a frequency range of 180 to 325 kHz.

This frequency range translates into a range of $AH_1$ mode wavelengths of between 11 and 41 mm. Similar analysis can be done for other mode types such as $SH_1$, $AH_2$ etc.

The required frequency range can be readily obtained using modern electronic circuitry. However, wide wavelength range can be difficult to achieve when using multi-element probes.

To be able to sweep across a wide range of the wavelengths, the transducers 9, 10 can incorporate a mechanism allowing smooth adjustment of the magnet spacing.

Figure 23:
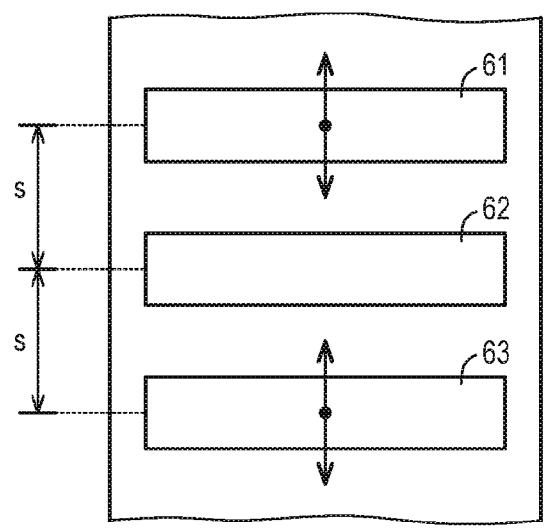
FIG. 23 is a schematic diagram of a three-element sensor showing a magnet arrangement in which a centre magnet is fixed and adjacent magnets can be adjusted so as to vary spacing.

FIG. 23 shows the magnet arrangement for the three-element sensor comprising first, second and third magnets 61, 62, 63. The second magnet 62 is interposed between the first and third magnets 61, 63 and is fixed. The first and third magnets 61, 63 are moveable so as to vary spacing, s. The spacing, s, be variable, for example, between 1 mm and 20 mm.

The magnets take the form of permanent magnets. However, the magnets may take the form of electromagnets.

This or similar arrangements can be readily incorporated into an EMAT or other form of multi-element ultrasonic transducer to achieve variable spacing.

Figure 24:
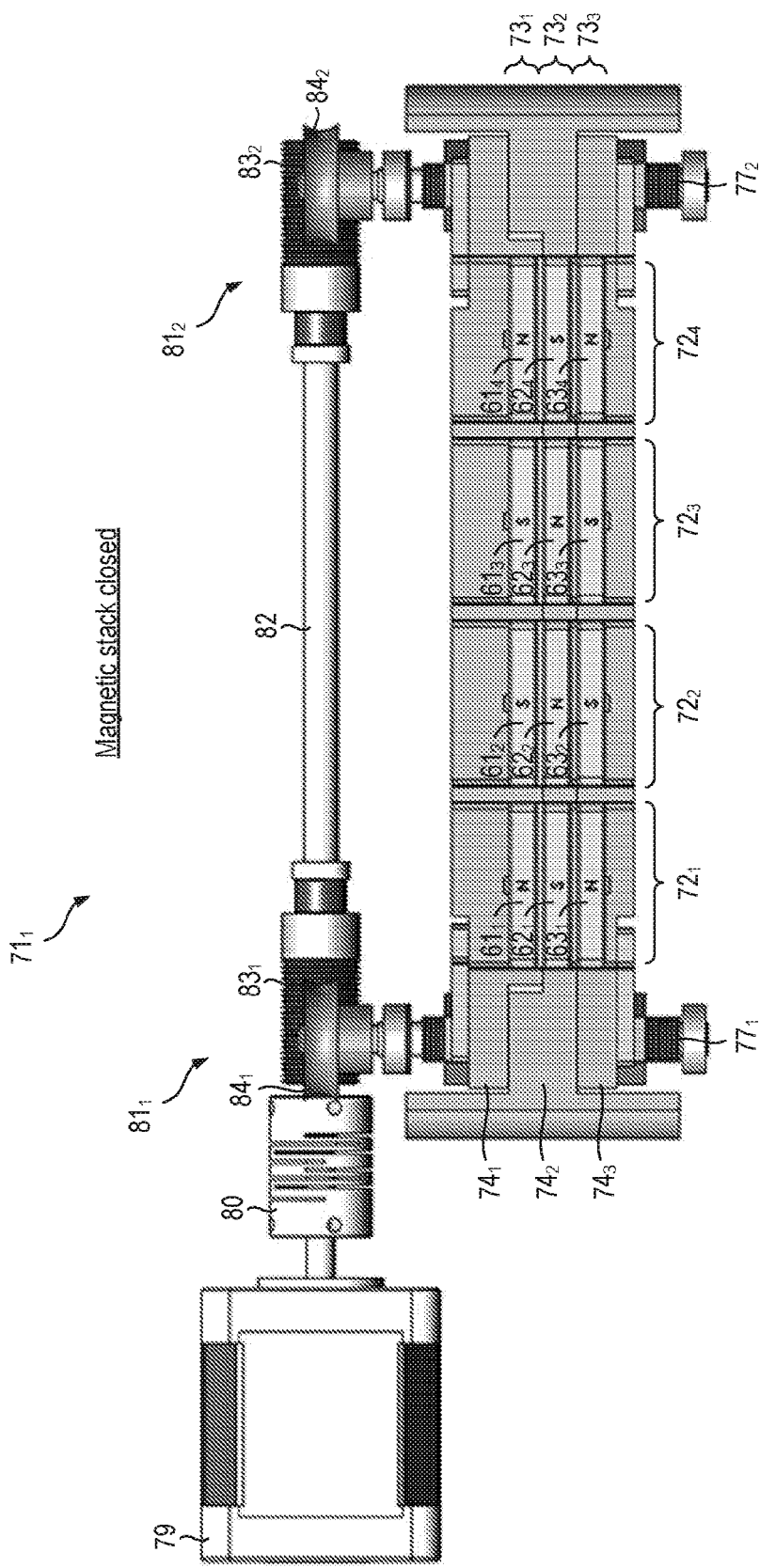
FIG. 24 is a plan view of a first transducer arrangement in which magnet spacing can be varied.

Referring to FIG. 24, a first transducer arrangement 71, is shown.

The arrangement includes a set of magnet stacks 72 comprising four stacks $72_1$, $72_2$, $72_3$, $72_4$ (or "columns") of three magnets $61_1$, $62_1$, $63_1$, $61_2$, $62_2$, $63_2$, $61_3$, $62_3$, $63_3$, $61_4$, $62_4$, $63_4$ each magnet lying in a row $73_1$, $73_2$, $73_3$. The magnetizations within each stack are symmetrical about a middle magnet 62, e.g. N-S-N or S-N-S. The inner stacks $72_2$, $72_3$ have the same magnetization arrangement of orientations, in this case S-N-S, and the outer stacks $72_1$, $72_4$ have the same magnetization arrangement of orientations, in this case N-S-N, opposite to the magnetization orientation arrangement of the inner stacks $72_2$, $72_3$.

Each row of magnets $73_2$ is provided on a separate beam $74_1$, $74_2$, $74_3$ having respective ends 75, 76 carried on first and second threaded shafts $77_1$, $77_2$. Rotation of the shafts $77_1$, $77_2$ causes the first and third beams $74_1$, $74_3$ to move apart away from the second, central beam $74_2$.

The arrangement $71_1$ includes a motor 79, a spring coupler 8o connected to a first worm gear set $81_1$, a drive shaft 82 and a second worm gear set $81_2$. The first and second worm gear sets $81_1$, $81_2$ comprise first and second worms $83_1$, $83_2$ respectively and first and second worm gears $84_1$, $84_2$ respectively. First and second worm gears $84_1$, $84_2$ are co-axially connected to the first and second first and second threaded shafts $77_1$, $77_2$ respectively such that rotation of the worm gear $84_1$, $84_2$ causes rotation of the threaded shafts $77_1$, $77_2$.

Figure 25A:
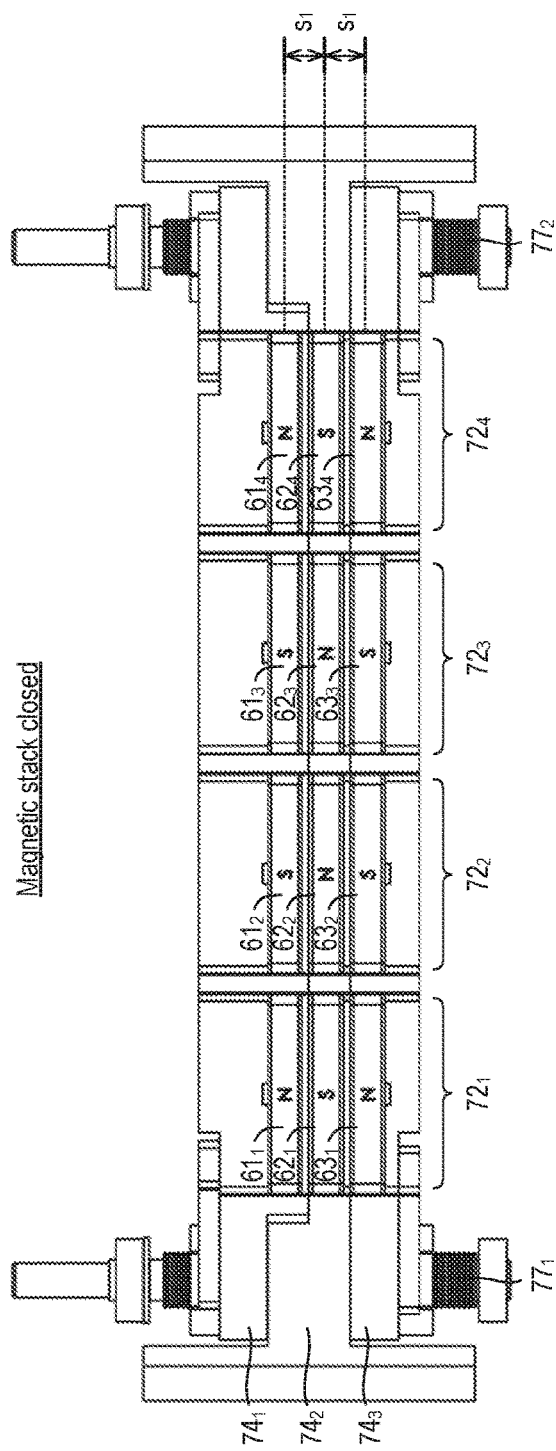
FIGS. 25a and 25b illustrate, in plan view, first and second magnet spacings respectively.
Figure 26A:
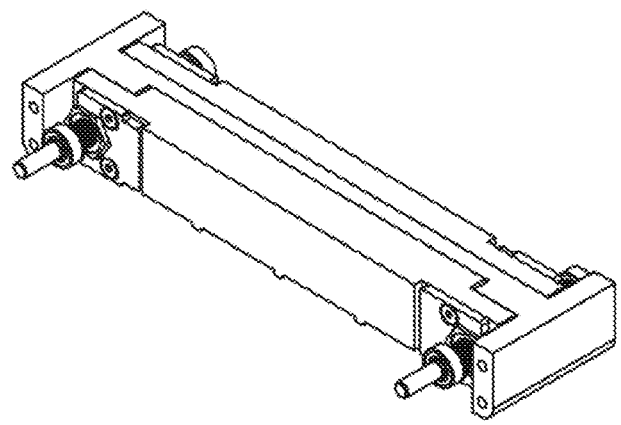
FIGS. 26a and 26b illustrate, in perspective view, first and second magnet spacings respectively.

FIGS. 25a and 26a show the magnetic stacks in a first position having minimum 35 spacing (here referred to as "closed" position), where the magnets in the same stack $72_1$ have a centre-to-centre spacing $s_1$.

Figure 25B:
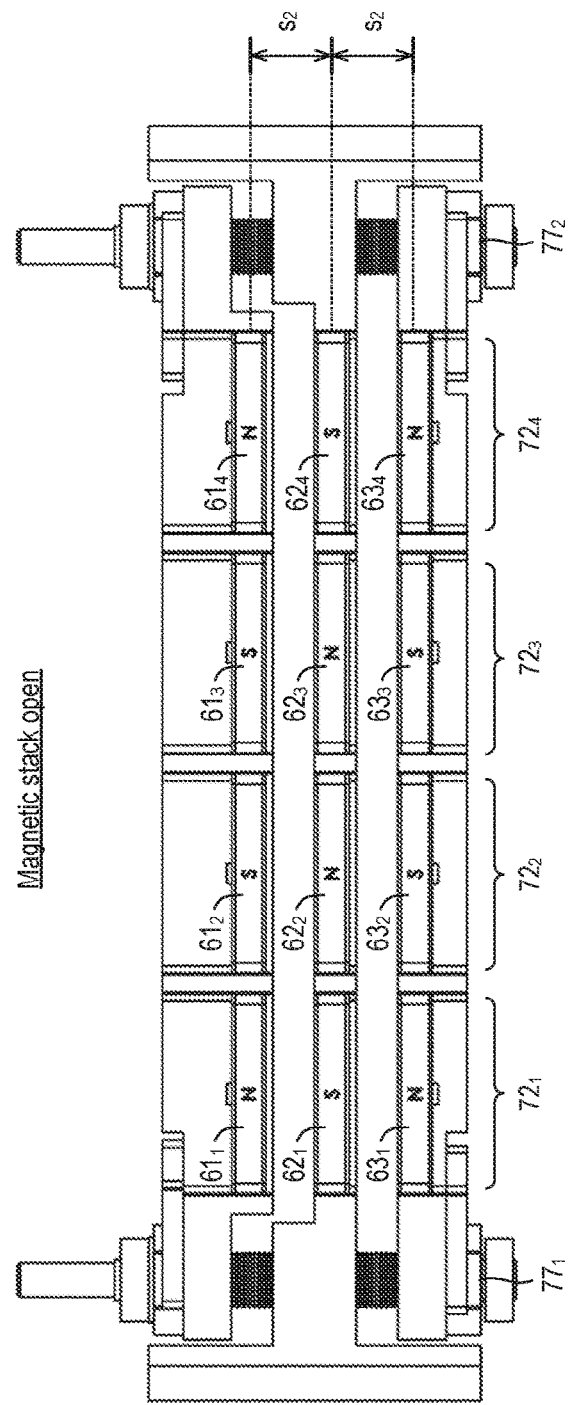
Figure 26B:
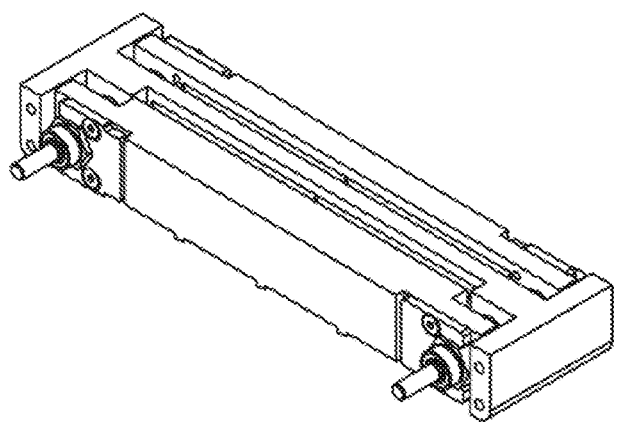

FIGS. 25b and 26b show the magnetic stacks in a second position having maximum spacing (here referred to as "open" position), where the magnets in the same stack $72_1$ have a centre-to-centre spacing $s_2$.

Referring to FIGS. 27a, 27b and 27c, a second transducer arrangement $71_2$ is shown.

The arrangement $71_2$ includes a set of magnet stacks 72 comprising two stacks $72_1$, $72_2$ of three magnets $61_1$, $62_1$, $63_1$, $61_2$, $62_2$, $63_2$, each magnet lying in a row $73_1$, $73_2$, $73_3$. The magnetizations within each stack are symmetrical about a middle magnet, e.g. N-S-N or S-N-S. The two stacks $72_1$, $72_2$ have opposite arrangements of magnetizations.

Each row of magnets $73_2$ is provided on a separate beam $74_1$, $74_2$, $74_3$. Each outer beam $74_1$, $74_3$ is mounted via a pair of socket head screws $86_{11}$, $86_{12}$, $86_{21}$, $86_{22}$ using a pair of parallel counterbore slots $87_{11}$, $87_{12}$, $87_{21}$, $87_{22}$ formed in a guide plate 88. The slots $87_{11}$, $87_{12}$, $87_{21}$, $87_{22}$ are angled with respect to a central line 89 between long sides 90 of the guide plate 88 such that as an outer beam $74_1$, $74_3$ slides along the guide plate 88 it moves away from the central line 88. The beams $74_1$, $74_2$, $74_3$ are mounted on transverse rails (not shown)

The arrangement $71_2$ includes a motor 89, a coupler 90o and a drive shaft 92. The motor rotates the drive shaft 92 which causes the drive plate to 88 to translate along the drive shaft 92 and, in doing so, moves the outer beams $74_1$, $74_3$ and the magnets they support away from the central line 88.

FIGS. 27a, 28a and 29a show the magnetic stacks in a first position having minimum spacing (here referred to as "closed" position), where the magnets in the same stack $72_1$ have a centre-to-centre spacing $s_1$.

FIGS. 27a, 28a and 29a show the magnetic stacks in a second position having maximum spacing (here referred to as "open" position), where the magnets in the same stack $72_1$ have a centre-to-centre spacing $s_2$.

It will be appreciated that various modifications may be made to the embodiments hereinbefore described. Such modifications may involve equivalent and other features which are already known in the design, manufacture and use of ultrasonic guided wave systems and component parts thereof and which may be used instead of or in addition to features already described herein. Features of one embodiment may be replaced or supplemented by features of another embodiment.

A single transducer, particularly a piezoelectric transducer, can be used which serves as both transmitter and receiver.

EMAT transducers need not be used. Instead, piezoelectric or magnetostrictive or other transducers can be used.

The wall- or plate-like structure can be a wall or plate, a pipe or a vessel, such as a cylindrical or rectangular tank with closed ends, or hollow bar or hollow box, such as a channel or conduit. The structure can be formed from a metal, metal alloy, plastic or any solid material. The type of material may affect the type of transducer used.

The defect need not be a corrosion-based defect.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of determining a thickness of a region of a wall- or plate-like structure which is thinner than a thickness of a surrounding region of the structure due to a cavity in the structure, the method comprising:
    comparing a measured time-frequency dispersion map for at least one dispersive guided wave obtained by measuring the structure using guided waves with a reference time-frequency dispersion map obtained by modelling the structure;
    determining a split frequency at which the measured time-frequency dispersion map and the reference time-frequency dispersion map differ; and
    calculating the thickness of the thinner wall thickness region in dependence upon the split frequency.

2. The method according to claim 1, wherein the at least one dispersive guided wave is at least one antisymmetric shear horizontal guided wave or at least one symmetric shear horizontal guided wave.

3. The method according to claim 1, further comprising:
    obtaining the measured time-frequency dispersion map by, for a set of different frequencies:
    causing a transmitter transducer to excite the structure using a tone burst at a given frequency;
    receiving a time-varying signal from a receiver transducer; and
    storing the time-varying signal.

4. The method according to claim 3, wherein causing the transmitter transducer to excite the structure using the tone burst at the given frequency causes a fundamental symmetric shear horizontal, SH0, guided wave and a first-excited mode antisymmetric shear horizontal, AH1, guided wave to be generated in the structure.

5. The method according to claim 1, wherein modelling the structure comprises generating the reference time-frequency dispersion map in dependence upon a thickness of the structure.

6. The method according to claim 5, wherein generating the reference time-frequency dispersion map comprises calculating a time of flight as a function of frequency or vice versa dependent on guided wave mode number, a distance between a transmitter transducer and a receiver transducer, a thickness of a wall or plate of the structure and bulk shear velocity.

7. The method according to claim 1, wherein modelling the structure comprises:
for a reference section of the structure;
causing the transmitter transducer to excite the structure using reference tone bursts;
receiving reference time-varying signals from a receiver transducer; and
determining a distance between a transmitter transducer and a receiver transducer and a thickness of a wall or plate of the structure in dependence upon the reference time-varying signal.

8. The method according to claim 1, wherein the wall- or plate-like structure is a pipe comprising a pipe wall.

9. A non-transitory computer-readable medium storing a computer program which, when executed by a computer, causes the computer system to perform a method according to claim 1.

10. A computer system comprising memory and at least one processor, the at least one processor configured to compare a measured time-frequency dispersion map for at least one dispersive guided wave obtained by measuring a structure using guided waves with a reference time-frequency dispersion map obtained by modelling the structure, to determine a cut-off frequency at which the measured time-frequency dispersion map and the reference time-frequency dispersion map differ and to calculate a thickness of a thinner region in dependence upon the cut-off frequency.

11. The computer system according to claim 10, wherein, for a set of different frequencies, to obtain the measured time-frequency dispersion map, the apparatus is configured to cause a transmitter transducer to excite the structure using a tone burst at a given frequency, to receive a time-varying signal from a receiver transducer and to store the time-varying signal.

12. The computer system according to claim 11, wherein:
the apparatus is configured to cause a transducer to be mechanically adjusted so as to access a different range of wavelengths.

13. The computer system according to claim 12, wherein causing the transducer to be mechanically adjusted so as to access the different range of wavelengths comprises causing spacing of elements in the transducer to change.

14. A guided wave inspection system comprising:
a computer system according to claim 10;
a transmitter comprising a transmitter transducer for exciting guided wave modes in the structure; and
a receiver comprising a receiver transducer for generating a time-varying signal.

15. The system according to claim 14, wherein the transmitter and receiver transducers comprise respective transducers.

16. The system according to claim 14, wherein the transmitter transducer and receive transducer comprise an electromagnetic acoustic transducer or first and second electromagnetic acoustic transducers.

* * * * *